US00RE50019E

(19) United States
(12) Reissued Patent
Hartsfield, Jr. et al.

(10) Patent Number: US RE50,019 E
(45) Date of Reissued Patent: Jun. 25, 2024

(54) TEMPERATURE CONTROLLED FOOD TRAY SYSTEM

(71) Applicant: Duke Manufacturing Co., St. Louis, MO (US)

(72) Inventors: Alvis Lloyd Hartsfield, Jr., Sugar Land, TX (US); Charles Horace Camp, Jr., Spring, TX (US)

(73) Assignee: Duke Manufacturing Co., St. Louis, MO (US)

(21) Appl. No.: 18/110,573

(22) Filed: Feb. 16, 2023

Related U.S. Patent Documents

Reissue of:
(64) Patent No.: 8,171,845
Issued: May 8, 2012
Appl. No.: 11/754,754
Filed: May 29, 2007

U.S. Applications:
(60) Provisional application No. 60/803,699, filed on Jun. 1, 2006.

(51) Int. Cl.
*A47J 36/24* (2006.01)
*A47F 3/04* (2006.01)
(Continued)

(52) U.S. Cl.
CPC ..... *A47J 36/2488* (2013.01); *A47F 3/0478* (2013.01); *A47F 10/06* (2013.01);
(Continued)

(58) Field of Classification Search
CPC ..... F25D 31/005
See application file for complete search history.

(56) References Cited

U.S. PATENT DOCUMENTS 2,299,347 A 10/1942 Rifkin
2,814,185 A 11/1957 Burg
(Continued)

FOREIGN PATENT DOCUMENTS

DE 10061201 6/2002
DE 10061201 A1 * 6/2002
(Continued)

OTHER PUBLICATIONS

2003 Flyer—Food Facilities Concepts, Inc., Preliminary Design Study, Cafeteria Renovation, Jun. 17, 2003, 1 page.
(Continued)

*Primary Examiner* — William E Dondero
(74) *Attorney, Agent, or Firm* — Stinson LLP

(57) ABSTRACT

The present disclosure provides a system, apparatus, and method for a modular food tray system having a plurality of food trays that can be used for heating, cooling, or a combination thereof. The system can include a first food tray for heating and a second food tray for cooling, generally mounted at a different elevation from the first food tray. Alternatively, one or both of the food trays can be designed for cooling through temperature elements coupled thereto and the tray can be heated by overhead radiant heating elements for dual temperature capabilities. The first food tray can be mounted above the second food tray. The first food tray can include a thermal shield between a heating element in the first food tray and the second food tray. In other embodiments, the second food tray can be mounted above the first food tray with a thermal shield therebetween.

145 Claims, 13 Drawing Sheets

(51) Int. Cl.

| | |
|---|---|
| ***A47F 10/06*** | (2006.01) |
| ***F25D 11/00*** | (2006.01) |
| ***F25D 31/00*** | (2006.01) |
| ***G05D 23/19*** | (2006.01) |
| ***H05B 3/00*** | (2006.01) |
| ***H05B 3/68*** | (2006.01) |

(52) U.S. Cl.

CPC ..... *F25D 11/003* (2013.01); *F25D 31/005* (2013.01); *G05D 23/1934* (2013.01); *H05B 3/0038* (2013.01); *H05B 3/68* (2013.01); *F25D 2400/08* (2013.01); *H05B 2203/028* (2013.01)

(56) References Cited

U.S. PATENT DOCUMENTS

| | | | | | |
|---|---|---|---|---|---|
| 2,934,913 | A * | 5/1960 | Haines | F24F 5/00 62/412 |
| 3,042,384 | A * | 7/1962 | Bauman | A47B 31/02 219/394 |
| 3,308,633 | A | 3/1967 | Kritzer, Jr. | |
| 3,516,485 | A | 6/1970 | Rhoads et al. | |
| 3,952,794 | A | 4/1976 | Spanoudis | |
| 3,999,601 | A | 12/1976 | Spanoudis | |
| 4,005,745 | A | 2/1977 | Colato et al. | |
| 4,203,486 | A | 5/1980 | Rubbright et al. | |
| 4,306,616 | A | 12/1981 | Woods, Jr. et al. | |
| 4,593,752 | A | 6/1986 | Tipton | |
| 4,856,579 | A | 8/1989 | Wolfe | |
| 4,884,626 | A * | 12/1989 | Filipowski | 165/231 |
| 5,086,693 | A | 2/1992 | Tippmann et al. | |
| 5,201,364 | A * | 4/1993 | Tippmann et al. | 165/265 |
| 5,388,429 | A | 2/1995 | Shackelford et al. | |
| 5,404,935 | A | 4/1995 | Liebermann | |
| 5,449,232 | A | 9/1995 | Westbrooks, Jr. et al. | |
| 5,598,886 | A | 2/1997 | Criado-Mellado | |
| 5,771,959 | A | 6/1998 | Westbrooks, Jr. et al. | |
| 5,910,210 | A * | 6/1999 | Violi et al. | 99/483 |
| 5,941,077 | A | 8/1999 | Safyan | |
| 5,947,012 | A * | 9/1999 | Ewald et al. | 99/374 |
| 5,961,866 | A | 10/1999 | Hansen | |
| 6,084,206 | A | 7/2000 | Williamson et al. | |
| 6,220,338 | B1 | 4/2001 | Grandi | |
| 6,279,470 | B2 | 8/2001 | Simeray et al. | |
| 6,315,039 | B1 | 11/2001 | Westbrooks et al. | |
| 6,434,961 | B2 | 8/2002 | Richmond et al. | |
| 6,539,846 | B2 | 4/2003 | Citterio et al. | |
| 6,561,317 | B1 | 5/2003 | Dudley | |
| 6,658,857 | B1 | 12/2003 | George | |
| 6,672,092 | B2 | 1/2004 | Ruiz et al. | |
| 6,735,971 | B2 | 5/2004 | Monroe et al. | |
| 6,817,201 | B2 | 11/2004 | Yingst | |
| 7,227,102 | B2 * | 6/2007 | Shei | 219/394 |
| RE40,151 | E * | 3/2008 | Shei et al. | 62/252 |
| 2002/0179131 | A1 * | 12/2002 | Johnson et al. | 135/66 |
| 2003/0080657 | A1 | 5/2003 | Koopman | |
| 2003/0108647 | A1 | 6/2003 | Grandi | |
| 2003/0154733 | A1 | 8/2003 | Ruiz et al. | |
| 2004/0069766 | A1 | 4/2004 | Haasis et al. | |
| 2004/0237959 | A1 | 12/2004 | Ashley | |
| 2005/0217298 | A1 | 10/2005 | Monroe et al. | |
| 2006/0162908 | A1 | 7/2006 | Tippmann | |
| 2008/0283440 | A1 | 11/2008 | Hartsfield, Jr. et al. | |

FOREIGN PATENT DOCUMENTS

| | | | |
|---|---|---|---|
| FR | 2759890 | A1 * | 8/1998 |
| FR | 2759890 | | 6/1999 |
| KR | 1020050026600 | A | 3/2005 |
| KR | 1020050031783 | A | 4/2005 |
| WO | WO2000/71950 | | 11/2000 |
| WO | WO2008/127330 | | 10/2008 |
| WO | WO2010151456 | | 12/2010 |

OTHER PUBLICATIONS

Atlas Metal Industries, Inc., _Mobile Cold Serving Unit_, Model No. BLC-4-RM, Oct. 2004, 2 Pgs.

Atlas Metal Industries, Inc., _Mobile Hot Serving Unit_, Model No. BLH-4, Mar. 2001, 2 Pgs.

Barker Sales, _QCF Series—Self-Service Drop-In Merchandiser_, Model Nos. QCF-3, -4, -5, -6, AND -8, May 2007, 2 Pgs.

Corrected IPR Petition Against U.S. Pat. No. 8,701,554, Jun. 12, 2015, 66 pages.

Declaration of Dr. J. Rhett Mayor in Support of Preliminary Injunction Re. U.S. Pat. Nos. 8,307,761, 8,661,970, and 9,795,253, Aug. 20, 2020, 335 pages.

Defendant Commercial Kitchens, Inc. Original Answer, Affirmative Defenses, and Counterclaim to Complaint Re. Infringement of U.S. Pat. No. 8,701,554, Nov. 18, 2014, 8 pages.

Delfield Co. Answer to Complaint and Counterclaim Re. Infringement of U.S. Pat. No. 8,997,640, Jan. 31, 2023, 29 pages.

Deposition of J. Rhett Mayor, Mar. 5, 2021, 135 pages.

Duke Manufacturing Co. Corrected Opening Brief on Appeal Re. U.S. Pat. Nos. 8,307,761, 8,661,970, and 9,795,253, Aug. 10, 2021, 148 pages.

Duke Manufacturing Co. Demonstrative Exhibits for the IPRs Re. U.S. Pat. Nos. 8,307,761, 8,661,970, and 9,795,253, Apr. 7, 2022, 127 pages.

Low Temp. Industries Demonstrative Exhibits for the IPRs Re. U.S. Pat. Nos. 8,307,761, 8,661,970, and 9,795,253, Apr. 7, 2022, 61 pages.

Duke Manufacturing Co. Memorandum in Support of its Motion for Partial Summary Judgment Re. U.S. Pat. Nos. 8,307,761, 8,661,970, and 9,795,253, Nov. 18, 2021, 30 pages.

Duke Manufacturing Co. Memorandum Re. its Motion to Amend its Preliminary Invalidity Contentions Re. U.S. Pat. Nos. 8,307,761, 8,661,970, and 979,525, Jul. 23, 2021 11 pages.

Duke Manufacturing Co. Motion for Partial Summary Judgment Re. U.S. Pat. Nos. 8,307,761, 8,661,970, and 9,795,253, Nov. 18, 2021, 7 pages.

Duke Manufacturing Co. Preliminary Reply in the IPR Re. U.S. Pat. No. 8,307,761, May 19, 2021, 15 pages,.

Duke Manufacturing Co. Preliminary Reply in the IPR Re. U.S. Pat. No. 8,661,970, May 19, 2021, 15 pages.

Duke Manufacturing Co. Preliminary Reply in the IPR Re. U.S. Pat. No. 9,795,253, May 19, 2021, 15 pages.

Duke Manufacturing Co. Reply Brief on Appeal Re. U.S. Pat. Nos. 8,307,761, 8,661,970, and 9,795,253, Sep. 13, 2021, 39 pages.

Duke Manufacturing Co. Reply in Support of its Motion for Partial Summary Judgment Re. U.S. Pat. Nos. 8,307,761, 8,661,970, and 9,795,253, Jan. 10, 2022 27 pages.

Duke Manufacturing Co. Reply in the IPR Re. U.S. Pat. No. 8,307,761, Jan. 27, 2022 48 pages.

Duke Manufacturing Co. Reply in the IPR Re. U.S. Pat. No. 8,661,970, Jan. 27, 2022 48 pages.

Duke Manufacturing Co. Reply in the IPR Re. U.S. Pat. No. 9,795,253, Jan. 27, 2022 48 pages.

Duke Manufacturing Co. Stipulation of Invalidity Contentions Re. U.S. Pat. Nos. 8,307,761, 8,661,970, and 9,795,253, Apr. 30, 2021, 5 pages.

Duke Manufacturing Co. Sur Reply in Opposition to Preliminary Injunction Re. U.S. Pat. Nos. 8,307,761, 8,661,970, and 9,795,253, Mar. 12, 2021, 43 pages.

Duke Mfg. Co., _2006 Standard Products Price Book_, 2 Pgs. Including Cover Page and p. 115_, (Applicant points out in the information disclosure statement that the year of publication is sufficiently earlier than the effective U.S. filing date and any foreign priority date so that the particular month of publication is not in issue, per MPEP 37 CFR 1.98(b)).

Expert Declaration of Dr. J. Rhett Mayor Re. the Validity of U.S. Pat. Nos. 8,307,761, 8,661,970, and 9,795,253, Apr. 22, 2021, 8 pages.

Expert Declaration of J. Rhett Mayor Re. Validity of U.S. Pat. No. 8,307,761, Oct. 21, 2020, 148 pages.

(56) References Cited

OTHER PUBLICATIONS

Expert Declaration of J. Rhett Mayor Re. Validity of U.S. Pat. No. 8,661,970, Oct. 21, 2020, 158 pages.
Expert Declaration of J. Rhett Mayor Re. Validity of U.S. Pat. No. 9,795,253, Oct. 21, 2020, 149 pages.
Expert Declaration of Kelly Homan Re. Invalidity of U.S. Pat. No. 8,307,761, Jan. 11, 2021, 200 pages.
Expert Declaration of Kelly Homan Re. Invalidity of U.S. Pat. No. 8,661,970, Jan. 11, 2021, 228 pages.
Expert Declaration of Kelly Homan Re. Invalidity of U.S. Pat. No. 9,795,253, Jan. 11, 2021, 195 pages.
Expert Declaration of Kelly Homan Re. Invalidity of U.S. Pat. Nos. 8,307,761, 8,661,970, and 9,795,253, Mar. 12, 2021, 241 pages.
Expert Report of Dr. J. Rhett Mayor Re. U.S. Pat. Nos. 8,307,761, 8,661,970, and 9,795,253, Sep. 23, 2021, 214 pages.
Expert Report of Kelly Homan Re. the Invalidity of U.S. Pat. No. 8,307,761, Sep. 23, 2020, 289 pages.
Expunged Corrected Inter Partes Review Petition Against U.S. Pat. No. 8,701,554, Jun. 8, 2015, 65 pages.
Feb. 16, 2022 Deposition of Kelly Homan, 98 pages.
Federal Circuit Decision Reversing the Preliminary Injunction Re. U.S. Pat. Nos. 8,307,761, 8,661,970, and 9,795,253, Dec. 28, 2021, 15 pages.
Final Written Decision in the IPR Re. U.S. Pat. No. 8,307,761, Jul. 6, 2022, 53 pages.
Final Written Decision in the IPR Re. U.S. Pat. No. 8,661,970, Jul. 6, 2022, 56 pages.
Final Written Decision in the IPR Re. U.S. Pat. No. 9,795,253, Jul. 15, 2022, 56 pages.
Flexible Heaters, 2014, (Applicant points out in the information disclosure statement that the year of publication is sufficiently earlier than the effective U.S. filing date and any foreign priority date so that the particular month of publication is not in issue, per MPEP 37 CFR 1.98(b)).
Flyer 1 Complete, _Bring Your Lunchroom to Life_, 2002-2003, 8 Pgs. (Applicant points out in the information disclosure statement that the year of publication is sufficiently earlier than the effective U.S. filing date and any foreign priority date so that the particular month of publication is not in issue, per MPEP 37 CFR 1.98(b)).
Flyer 2 Complete, _Bring Your Lunchroom to Life_, 2003-2004, 8 Pgs. (Applicant points out in the information disclosure statement that the year of publication is sufficiently earlier than the effective U.S. filing date and any foreign priority date so that the particular month of publication is not in issue, per MPEP 37 CFR 1.98(b)).
Hatco Corporation, _Glo-Ray Designer Merchandising Warmers_, Model Nos. GR2SDH and GR2SDS, Undated, 2 Pgs.
Hatco Corporation, _Glo-Ray Pizza Warmers_, Model Nos. GRPWS Series, 2 Pgs.
Hatco Glo-Ray Operator_S Manual, Jul. 2012, 24 pages.
How a Silicone Heating Pad Works, Feb. 11, 2021, 5 pages.
Institution Decision in the IPR Re. U.S. Pat. No. 8,307,761, Jul. 9, 2021, 35 pages.
Institution Decision in the IPR Re. U.S. Pat. No. 8,661,970, Jul. 9, 2021, 39 pages.
Institution Decision in the IPR Re. U.S. Pat. No. 9,795,253, Jul. 20, 2021, 44 pages.
Inter Partes Review Petition Against U.S. Pat. No. 8,307,761, Jan. 12, 2021, 118 pages.
Inter Partes Review Petition Against U.S. Pat. No. 8,661,970, Jan. 12, 2021, 129 pages.
Inter Partes Review Petition Against U.S. Pat. No. 9,795,253, Jan. 12, 2021, 134 pages.
Invalidity Contentions for U.S. Pat. No. 8,307,761—Part 1, Mar. 12, 2021, 500 pages.
Invalidity Contentions for U.S. Pat. No. 8,307,761 based on Duke Heritage Buffet, Jul. 23, 2021, 76 pages.
Invalidity Contentions for U.S. Pat. No. 8,307,761 based on Finegan, Dec. 11, 2020, 87 pages.
Invalidity Contentions for U.S. Pat. No. 8,307,761 based on Load King Diamond Bar, Jul. 23, 2021, 114 pages.
Invalidity Contentions for U.S. Pat. No. 8,307,761 based on Richmond, Dec. 11, 2020, 88 pages.
Invalidity Contentions for U.S. Pat. No. 8,307,761 based on Shackelford, Dec. 11, 2020, 27 pages.
Invalidity Contentions for U.S. Pat. No. 8,661,970 based on Duke Heritage Buffet, Jul. 23, 2021, 188 pages.
Invalidity Contentions for U.S. Pat. No. 8,661,970 based on Finegan, Dec. 11, 2020, 224 pages.
Invalidity Contentions for U.S. Pat. No. 8,661,970 based on Load King Diamond Bar, Jul. 23, 2021, 242 pages.
Invalidity Contentions for U.S. Pat. No. 8,661,970 based on Richmond, Dec. 11, 2020, 207 pages.
Invalidity Contentions for U.S. Pat. No. 8,661,970 based on Shackelford, Dec. 11, 2020, 26 pages.
Invalidity Contentions for U.S. Pat. No. 9,795,253 based on Duke Heritage Buffet, Jul. 23, 2021, 98 pages.
Invalidity Contentions for U.S. Pat. No. 9,795,253 based on Finegan, Dec. 11, 2020, 122 pages.
Invalidity Contentions for U.S. Pat. No. 9,795,253 based on Load King Diamond Bar, Jul. 23, 2021, 165 pages.
Invalidity Contentions for U.S. Pat. No. 9,795,253 based on Richmond, Dec. 11, 2020, 146 pages.
Invalidity Contentions for U.S. Pat. No. 9,795,253 based on Shackelford, Dec. 11, 2020, 21 pages.
Invalidity Contentions for U.S. Pat. No. 8,307,761—Part 2, Mar. 12, 2021, 449 pages.
Jul. 8, 2021 Deposition of Dennis Finegan, 120 pages.
Jun. 25, 2021 Deposition of Alvis Hartsfield, 130 pages.
Kitchen Equipment Fabricating Co. Answer to Counterclaim Re. Infringement of U.S. Pat. No. 8,701,554, Dec. 11, 2014, 5 pages.
Low Temp Indus. Corrected Responsive Brief on Appeal Re. U.S. Pat. Nos. 8,307,761, 8,661,970, and 9,795,253, Sep. 7, 2021, 77 pages.
Low Temp Indus. Preliminary Response in the IPR Re. U.S. Pat. No. 8,661,970, Apr. 22, 2021, 71 pages.
Low Temp Indus. Preliminary Response in the IPR Re. U.S. Pat. No. 9,795,253, Apr. 28, 2021, 73 pages.
Low Temp Indus. Preliminary Response in the IPR Re. U.S. Pat. No. 8,307,761, Apr. 22, 2021, 69 pages.
Low Temp Indus. Preliminary Sur Reply in the IPR Re. U.S. Pat. No. 8,307,761, May 26, 2021, 15 pages.
Low Temp Indus. Preliminary Sur Reply in the IPR Re. U.S. Pat. No. 8,661,970, May 26, 2021 15 pages.
Low Temp Indus. Preliminary Sur Reply in the IPR Re. U.S. Pat. No. 9,795,253, May 26, 2021, 16 pages.
Low Temp Indus. Response for Preliminary Injunction Re. U.S. Pat. Nos. 8,307,761, 8,661,970, and 9,795,253, Apr. 2, 2021, 41 pages.
Low Temp Indus. Response in the IPR Re. U.S. Pat. No. 8,307,761, Oct. 21, 2021, 81 pages.
Low Temp Indus. Response in the IPR Re. U.S. Pat. No. 8,661,970, Oct. 21, 2021, 81 pages.
Low Temp Indus. Response in the IPR Re. U.S. Pat. No. 9,795,253, Oct. 21, 2021, 70 pages.
Low Temp Indus. Sur Reply in the IPR Re. U.S. Pat. No. 8,307,761, Mar. 3, 2022, 38 pages.
Low Temp Indus. Sur Reply in the IPR Re. U.S. Pat. No. 8,661,970, Mar. 3, 2022, 38 pages.
Low Temp Indus. Sur Reply in the IPR Re. U.S. Pat. No. 9,795,253, Mar. 3, 2022, 38 pages.
Low Temp. Industries Reply in Support of its Motion for Preliminary Injunction Re. U.S. Pat. Nos. 8,307,761, 8,661,970, and 9,795,253, Oct. 12, 2020, 37 pages.
Mar. 23, 2021 Deposition of Kelly Homan, 90 pages.
Oct. 1, 2021 Deposition of Kelly Homan, 245 pages.
Order Granting Motion for Preliminary Injunction Re. U.S. Pat. Nos. 8,307,761, 8,661,970, and 9,795,253, Jun. 25, 2021, 40 pages.
Original Inter Partes Review Petition Against U.S. Pat. No. 8,701,554, Mar. 16, 2015, 6 pages.
Preliminary Injunction Hearing Transcript, Apr. 19, 2021, 289 pages.
Prosecution History of U.S. Pat. No. 8,171,845, Dec. 29, 2014, 438 pages.

(56) References Cited

OTHER PUBLICATIONS

Prosecution History of U.S. Pat. No. 8,701,554, Aug. 6, 2015, 275 pages.
Prosecution History of U.S. Pat. No. 8,997,640, May 24, 2016, 322 pages.
Rebuttal Report of Dr. J. Rhett Mayor Re. Validity of U.S. Pat. Nos. 8,307,761, 8,661,970, and 9,795,253, Nov. 8, 2021, 177 pages.
Second Declaration of Dr. J. Rhett Mayor in Support of Preliminary Injunction Re. U.S. Pat. Nos. 8,307,761, 8,661,970, and 9,795,253, Oct. 12, 2020, 61 pages.
Second Expert Declaration of Kelly Homan Re. Invalidity of U.S. Pat. No. 8,307,761, Jan. 27, 2022, 74 pages.
Second Expert Declaration of Kelly Homan Re. Invalidity of U.S. Pat. No. 8,661,970, Jan. 27, 2022, 79 pages.
Second Expert Declaration of Kelly Homan Re. Invalidity of U.S. Pat. No. 9,795,253, Jan. 27, 2022, 72 pages.
Supplemental Expert Declaration of Kelly Homan Re. Invalidity of U.S. Pat. Nos. 8,307,761, 8,661,970, and 9,795,253, Mar. 12, 2021, 75 pages.
Supplemental Declaration of Kelly Homan in Opposition of Preliminary Injuction Re. U.S. Pat. Nos. 8,307,761, 8,661,970, and 9,795,253, Mar. 12, 2021, 75 pages.
The Delfield Company, _F5 Serview Drop In—30_ Deep Mirrored Self-Contained Refrigerated Display Cases_, Jan. 2004, 2 pages.
The Delfield Company, _Mobile Ice Pan Serving Counters_, Shelleyglas, Model KCI and KCI-NU, May 2007, 2 pages.
Third Declaration of Dr. J. Rhett Mayor in Support of Preliminary Injunction Re. U.S. Pat. Nos. 8,307,761, 8,661,970, and 9,795,253, Apr. 2, 2021, 19 pages.
Wayback Machine Describing Glo-Ray Headed Shelves, 4_10_04, Oct. 6, 2014, 2 Pgs.
Duke Manufacturing Co. Hot-Cold Convertible Unit Drop In, 2010, 2 pages (Applicant points out in the information disclosure statement that the year of publication is sufficiently earlier than the effective U.S. filing date and any foreign priority date so that the particular month of publication is not in issue, per MPEP 37 CFR 1.98(b)).
Duke Manufacturing Co. HB3-1H2C Heritage Buffet—Hot-Cold Cold Pan, Sep. 26, 2019, 2 pages.
Duke Manufacturing Co. E303SW Aerohot Foodservice Hot Food Units—Electric—Sealed Wells, May 2011, 2 pages.
Duke Manufacturing Co. E303-25 AeroServ Serving Systems—Hot Food Units—Electric, Jun. 2008, 2 pages.
Duke Manufacturing Co. E-3-CBSS Thurmaduke Steamtables Hot Food Units—Electric—Standard, Jun. 2008, 2 pages.
Duke Manufacturing Co. Drop Ins, 2010, 4 pages, (Applicant points out in the information disclosure statement that the year of publication is sufficiently earlier than the effective U.S. filing date and any foreign priority date so that the particular month of publication is not in issue, per MPEP 37 CFR 1.98(b)).
Duke Manufacturing Co. ADI-3E-SW Hot Food Electric—Sealed Well—Drop In, May 2022, 2 pages.
Duke Manufacturing Co. 304-25PG AeroServ Serving Systems—Hot Food Units—Gas, Oct. 2008, 2 pages.
Duke Manufacturing Co. 212-ADI3HC Hot-Cold Convertible Unit Drop In, Jan. 2015, 2 pages.
Declaration of James Bigott Re. Commercial Product Embodied by U.S. Pat. Nos. 8,307,761, 8,661,970, and 9,795,253, Sep. 23, 2021, 85 pages.
The Delfield Company; "Mobile Ice Pan Serving Counters"; Model KCI and KCI-NU; www.delfield.com.
Atlas Metal Industries, Inc., "Mobile Hot Serving Unit"; Model No. BLH-4.
Atlas Metal Industries, Inc., "Mobile Cold Serving Unit"; Model No. BLC-4-RM.
Duke Manufacturing Co.; "Example Serving Line—Mod-U-Serve".
Hatco Corporation, "Glo-Ray Designer Merchandising Warmers"; Model Nos. GR2SDH; www.hatcocorp.com.
Hatco Corporation, "Glo-Ray Pizza Warmers"; Model Nos. GRPWS; www.hatcocorp.com.
The Delfield Company; "F5 Service Drop in—Deep Mirrored Self0Contained Refrigerated Display Cases"; Model Nos. F5MC48D and F5MC72D; www.delfield.com.
Barker Sales; "QCF Series—Self-Service Drop-In Merchandiser"; Model Nos. QCF3, 4, 5, 6, and 8; www.barkersales.com.

* cited by examiner

TEMPERATURE CONTROLLED FOOD TRAY SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims the benefit of U.S. Provisional Application Ser. No. 60/803,699, filed Jun. 1, 2006, which is incorporated herein by reference in its entirety.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO APPENDIX

Not applicable.

BACKGROUND

1. Field of the Invention

The invention relates to the food service industry. More specifically, the invention relates to systems for displaying and providing temperature controlled food items.

2. Description of Related Art

Food trays and counters are ubiquitous to the food service industry. Some foods trays are used to store in-process food items and other are used to serve prepared food items to a consuming public. Most food trays are rather simple support surfaces for the food items and typically made of stainless steel or other sanitary materials. A plurality of food trays mounted together is used to create a display shelf unit that supports a tiered assembly of food items for display and selection. Some display shelves include heat lamps directed at the food items to maintain a desired food temperature. Typically, these heat lamps are mounted above the food items under an upper food tray or other support surface.

However, some display food items need cooling rather than heating. For cooling, conventional wisdom directs the food service industry to a refrigerated enclosed display case with doors. The refrigeration unit includes a fan that forces refrigerated air within the enclosed case. Customers must open the doors to retrieve the cooled items. In some instances, a single level food tray without doors is used to support cooled food items and the food tray is cooled by an underlying refrigeration unit with coils in contact with the food tray.

However, there are some instances in which a cooling and heating capacity would be appropriate in the same display shelf unit. Conventional wisdom directs against such dual capabilities because of the competing thermal needs that cancel each other. Thus, there remains a need to provide a dual use display shelf unit.

BRIEF SUMMARY

The present disclosure provides a system, apparatus, and method for a modular food tray system having a plurality of food trays that can be used for heating, cooling, or a combination thereof. The system can include a first food tray for heating and a second food tray for cooling, generally mounted at a different elevation from the first food tray. Alternatively, one or both of the food trays can be designed for cooling or heating through one or more temperature elements coupled thereto, or the tray can be heated by overhead radiant heating elements, for dual temperature capabilities. The first food tray can be mounted above the second food tray. The first food tray can include a thermal shield at least partially between the first food tray and the second food tray. In other embodiments, the second food tray can be mounted above the first food tray with a thermal shield at least partially therebetween.

The disclosure provides a temperature controlled food tray system, comprising: a first food tray with a cooling element coupled to the first food tray; a refrigeration unit coupled to the temperature element of the first food tray; at least one heating element coupled to the first food tray; and a controller adapted to activate the heating element and to deactivate the cooling element of the first food tray and to operate the first food tray as a heating food tray, the controller being further adapted to deactivate the heating element and to activate the cooling element of the first food tray and to operate the first food tray as a cooling food tray. In at least one embodiment, the heating element can be a radiant heating element directed toward one or more of the trays. In another embodiment, the food tray can include a heating element and a cooling element embedded within the tray and selectively controllable.

The disclosure also provides a temperature controlled food tray system, comprising: a first food tray with a heating element coupled to the first food tray and adapted to heat the first food tray; a second food tray with a cooling element coupled to the second food tray and adapted to cool the second food tray; the second food tray being coupled to the first food tray; and a refrigeration unit coupled to the cooling element.

The disclosure further provides a temperature controlled food tray system, comprising: a support structure comprising at least one upright member and at least a first tray support and a second tray support, the tray supports being coupled to the upright member; a first food tray coupled to the first tray support; and a second tray being coupled to the second tray support; the first and second trays being interchangeably coupled to the first and second tray supports and the first and second trays being coupled to a heating outlet, a cooling outlet, or a combination thereof.

BRIEF DESCRIPTION OF THE DRAWINGS

While the concepts provided herein are susceptible to various modifications and alternative forms, only a few specific embodiments have been shown by way of example in the drawings and are described in detail below. The figures and detailed descriptions of these specific embodiments are not intended to limit the breadth or scope of the concepts or the appended claims in any manner. Rather, the figures and detailed written descriptions are provided to illustrate the concepts to a person of ordinary skill in the art as required by 35 U.S.C. §112.

DETAILED DESCRIPTION

One or more illustrative embodiments of the concepts disclosed herein are presented below. Not all features of an actual implementation are described or shown in this application for the sake of clarity. It is understood that the development of an actual embodiment, numerous implementation-specific decisions must be made to achieve the developer's goals, such as compliance with system-related, business-related and other constraints, which vary by implementation and from time to time. While a developer's efforts might be complex and time-consuming, such efforts would be, nevertheless, a routine undertaking for those of ordinary skill in the art having benefit of this disclosure.

Figure 1:
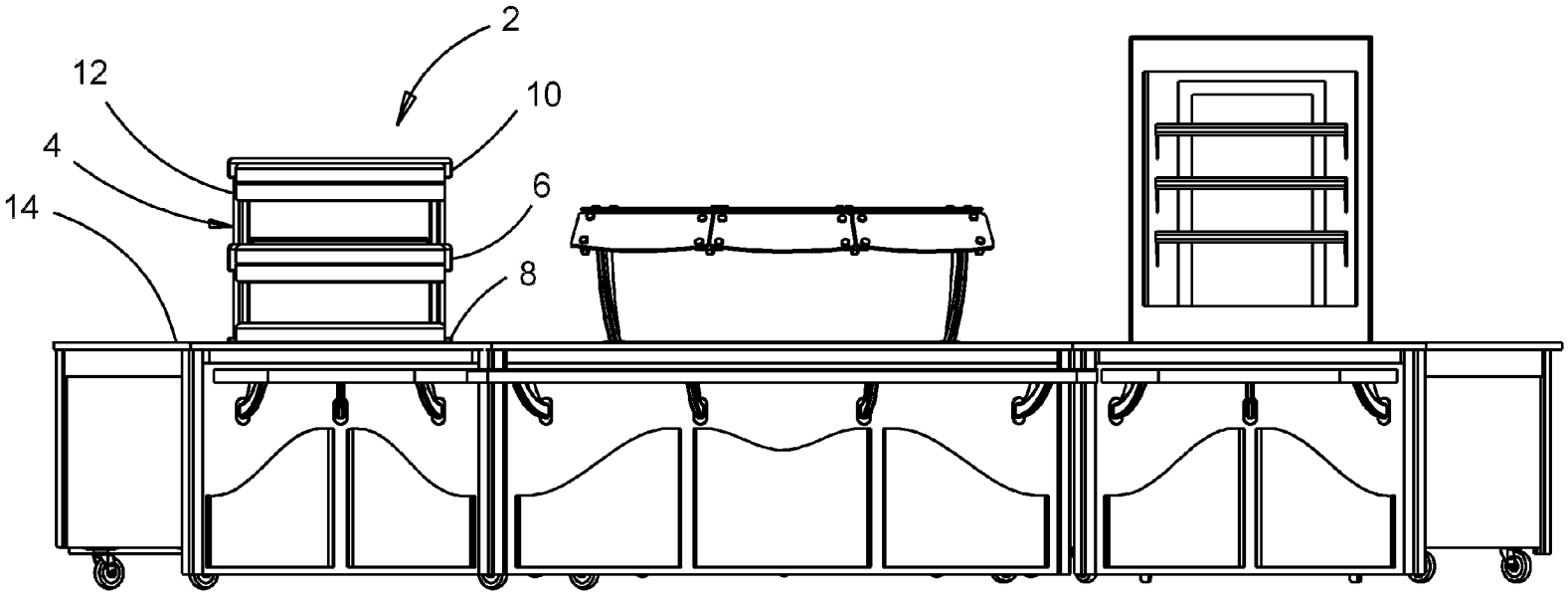
FIG. 1 is a schematic side view of an exemplary arrangement of a food tray system coupled with a supporting counter.

FIG. 1 is a schematic side view of an exemplary arrangement of a food tray system coupled with a supporting counter. A food tray system 2 generally includes a support structure 4 with one or more food tray supports, such as a first tray support 6 and a second tray support 8. In some embodiments, the food tray system 2 further includes a top 10 that can include a canopy, or other structure over a food tray support. The tray supports can be mounted at various elevations using an upright structure 12 that couples the tray supports together. Further, a counter 14 can be used to support the food tray system 2 at an elevation as desired. The counter 14 can be mounted on wheels, or other objects to facilitate movement of the counter with the food tray system.

Figure 2:
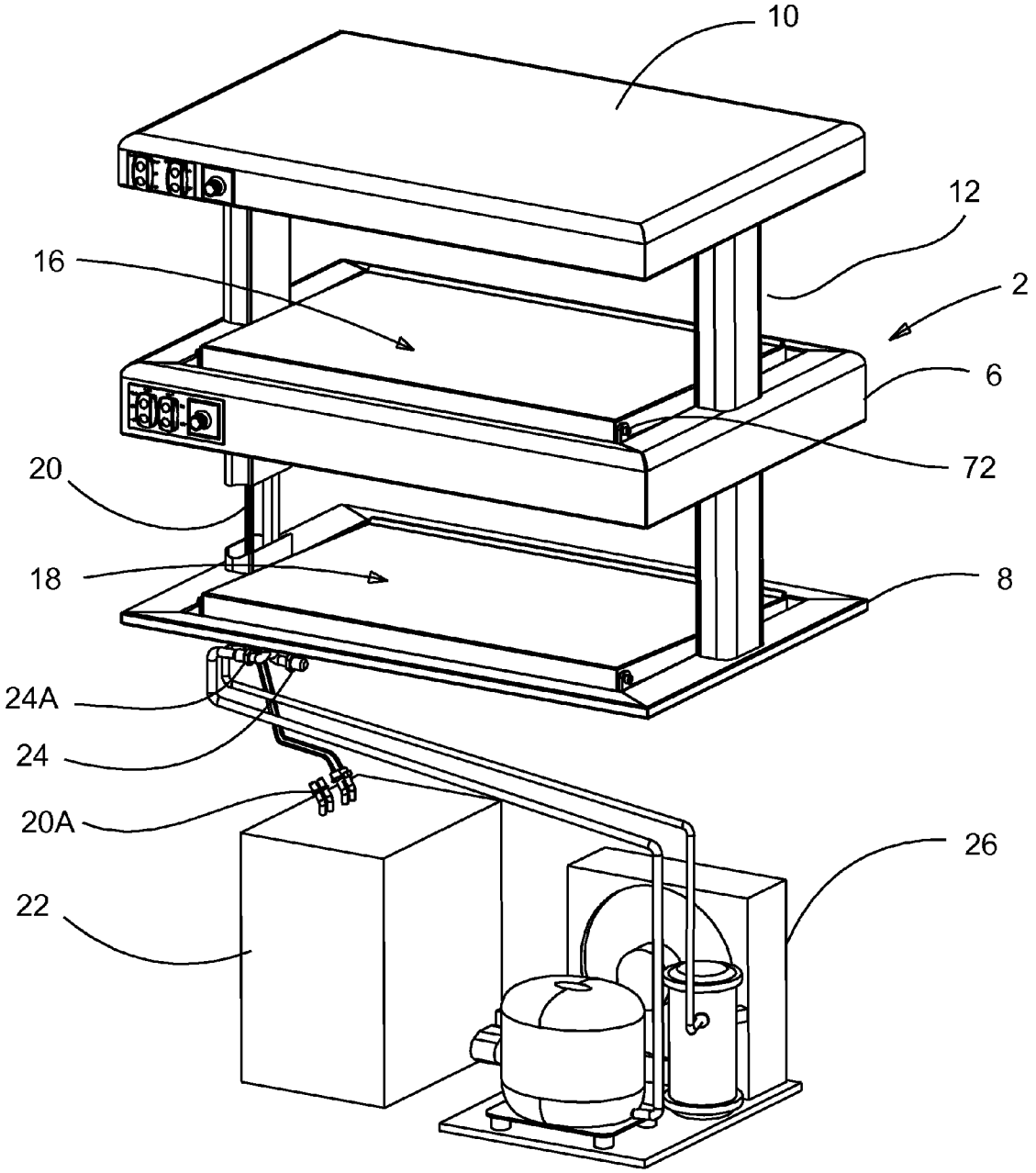
FIG. 2 is a schematic perspective view of an exemplary food tray system.
Figure 3:
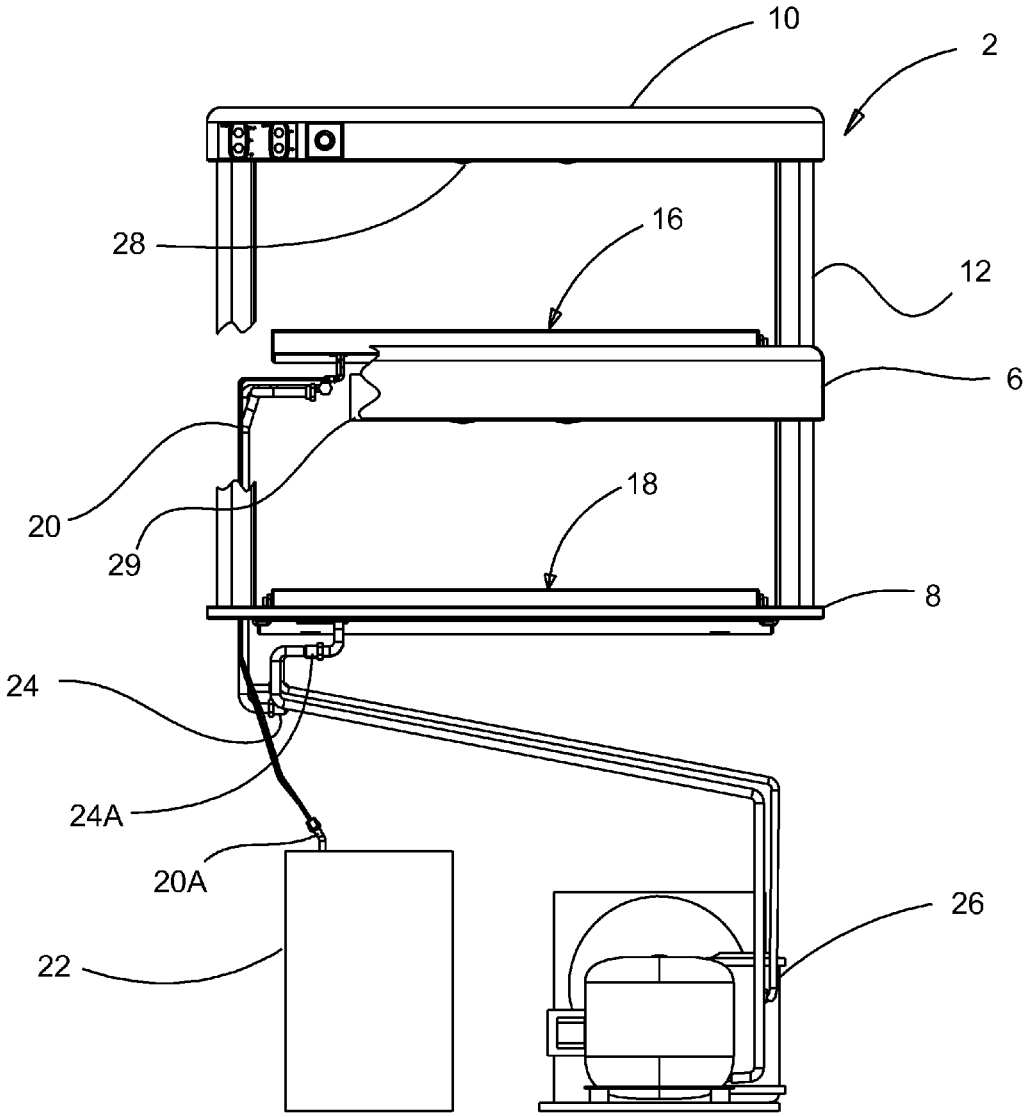
FIG. 3 is a schematic rear view of the exemplary food tray system.
Figure 4:
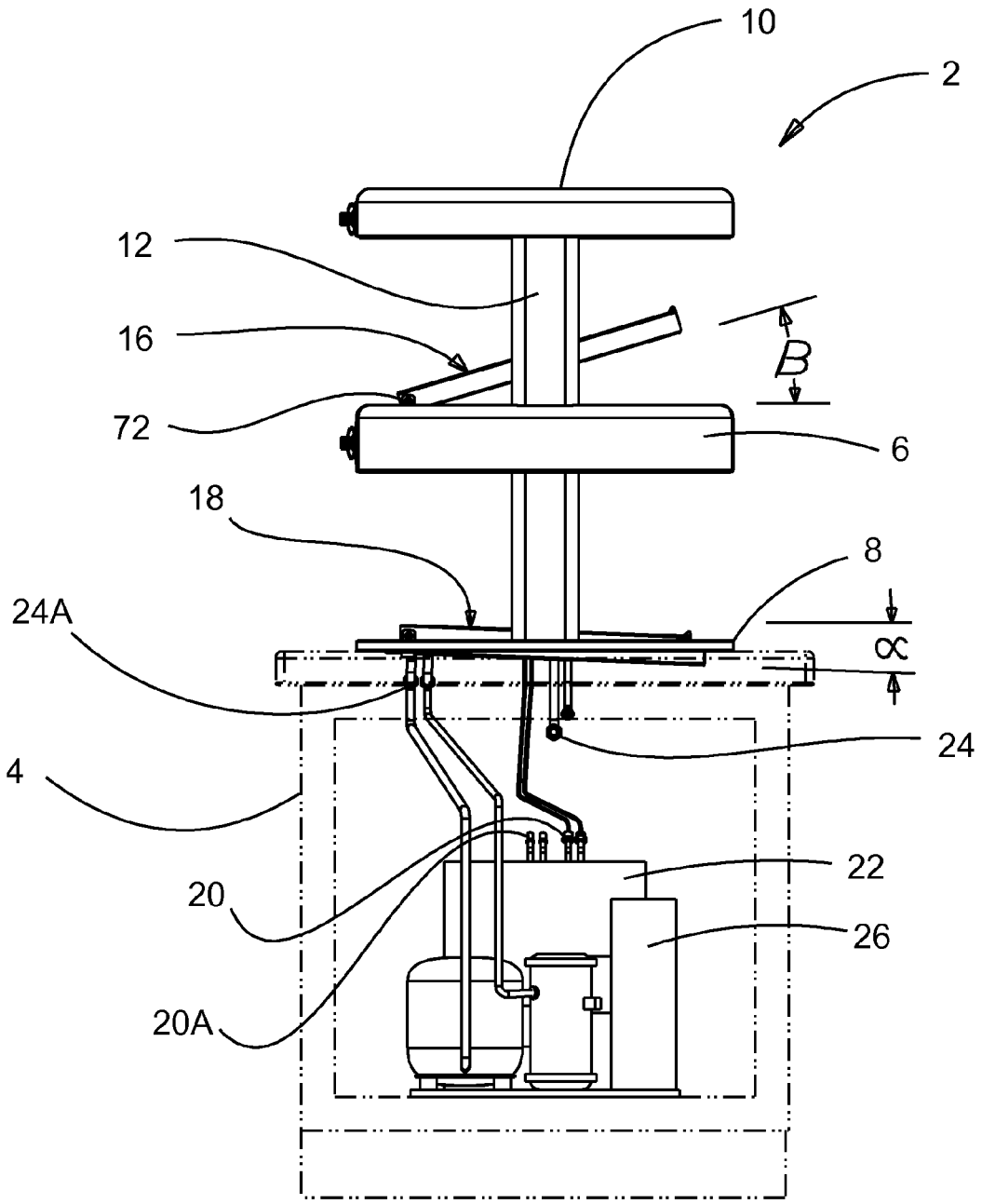
FIG. 4 is a schematic side view of the exemplary food tray system.

FIG. 2 is a schematic perspective view of an exemplary food tray system. FIG. 3 is a schematic rear view of the exemplary food tray system. FIG. 4 is a schematic side view of the exemplary food tray system. The figures will be described in conjunction with each other. The food tray system 2 as described above, includes a support structure having at least one upright structure 12 of any shape coupled with one or more tray supports 6, 8 to support food trays. The top 10 can be disposed at a different elevation above at least one of the tray supports, such as the first tray support 6. A first food tray 16 can be coupled to the first tray support 6. Similarly, a second food tray 18 can be coupled to the second tray support 8. In at least one embodiment, the first food tray 16 can be a heating food tray and the second food tray 18 can be a cooling food tray. In the exemplary food tray system shown in FIG. 2, the food tray 16 can be disposed at a higher elevation above the second food tray 18. The food tray system 2 further includes one or more heating outlets, such as a heating outlet 20 for coupling with the first food tray 16, and a heating outlet 20A for coupling with a second food tray 18. Other heating outlets can be coupled to other food trays as appropriate. In at least one exemplary embodiment, the heating outlets can include electrical wiring, conduit, or other structure that can provide a source of energy for the heating element described herein. The heating outlet 20 can be a connectible and disconnectible source of heating power for the heating food trays. The heating outlet 20 is coupled to a heating source 22. The heating source 22 is represented in a schematic form and is to be broadly construed to include a source of electricity if, for example, the heating outlet is an electrical outlet to provide power to a resistive heating element. Further, the heating source 22 can schematically include a source of hot fluid, such as hot water that can be circulated through conduit and used to heat one or more of the heating food trays.

Similarly, the food tray system 2 can include one or more cooling outlets, such as cooling outlets 24, 24A for coupling with the food trays 16, 18. The cooling outlets can be coupled between the food tray and a source of cooling energy. The cooling outlet provide cooling energy to the cooling element, such providing cool fluid, refrigerant, or other cooling energy. The cooling outlet can be connectible and disconnectible to the food trays. When the heating outlets and/or cooling outlets are not used or coupled to a corresponding food tray, the system can be protected from shorting, leakage, or other adverse conditions by capping or sealing the outlets.

One or more of the cooling outlets 24, 24A can be coupled to a refrigeration unit 26 to provide cooling energy to the cooling outlet and then to the cooling food tray. The refrigeration unit 26 can include elements as are known to those with ordinary skill in the art for providing cooling energy. For example, if the unit is a refrigerant based system, such system would generally include a compressor, accumulator, evaporator, expansion valve, condenser, fan, and a control system for controlling the operation thereof. In other embodiments, the refrigeration unit could include a chilled system with circulating water, glycol, or other fluid.

In some embodiments, at least one radiant heating element 28 can provide radiant energy to at least one of the food trays and food items disposed on the food trays, such as the first food tray 16. The radiant heating element 28 can be mounted under the top 10 and directed downward toward the first food tray 16. If the top 10 is a support structure, such as a frame, the radiant heating element can be mounted at any appropriate position so that the radiant energy is directed to the first food tray 16.

A hinge joint 72 with pins and links can be provided with the food tray. The hinge joint allows the tray to be rotated upward for cleaning under the tray. A controller 66 can control the operation of the heating and cooling aspects of the tray 16. The controller can includes switches for operating the cooling element, heating element, lights, and the like.

The counter 14, shown in FIG. 1, can support the food tray system 2 and at least partially enclose the refrigeration unit 26 for aesthetic and other purposes. In other embodiments, the refrigeration unit can be located remotely to the food tray system.

Figure 5:
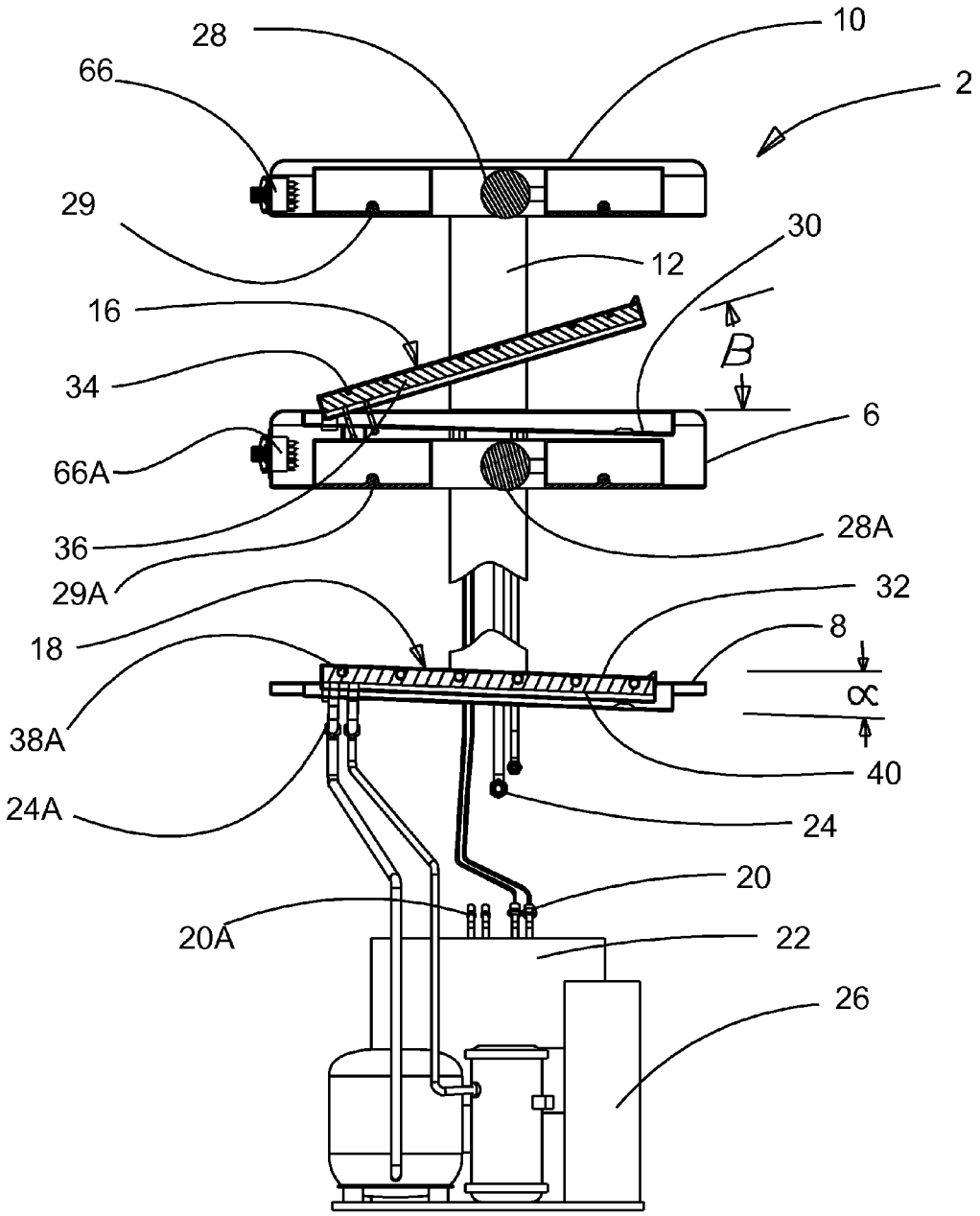
FIG. 5 is a schematic cross sectional view of the exemplary food tray system.

FIG. 5 is a schematic cross sectional view of the exemplary food tray system. The system 2 includes the first tray support 6 coupled with a second tray support 8 through a support structure 4. This support structure generally includes an upright structure 12 coupled with the first tray support 6 and a second tray support 8. The first food tray 16 can be supported by the first tray support 6 in a modular fashion. The second tray support 8 can support the second food tray 18 in a similar modular fashion. Depending on requirements and design criteria for a particular application, the first food tray 16 can be a heating food tray and the second food tray 18 can be a cooling food tray. Alternatively, the first tray support 6 can support a cooling food tray and the second tray support 8 can support a heating food tray. Still further, the food tray system 2 could modularly be interchanged with a plurality of heating food trays or a plurality of cooling food trays. Naturally, the number is only limited by practical considerations and can be more or less than the two tray supports and two food trays shown herein.

The system can further include a radiant heating element 28 mounted above one or more of the food trays, such as the heating first food tray 16. Another radiant heating element 28A can be mounted to a bottom surface of the first tray support 6 for the lower tray 18. Radiant energy can be directed from the heating element 28A to food items stored on the food tray 18 coupled to the second tray support 8.

One or more lights to illuminate the food tray and items disposed thereon can be coupled to the food tray system. For example, lights 29 can be coupled to the top 10 to illuminate tray 16, and lights 29A can be coupled to the tray support 6 to illuminate the tray 18. A controller 66 can control the operation of the heating and cooling aspects of the tray 16 as well as lights and other system elements.

In at least one embodiment, the food trays can be angled relative to the relative tray support. For example, a top surface 30 of the tray support 6 can be horizontal and a top surface 32 of the first food tray 16 can be disposed at an angle "$\alpha$" thereto. This angle may facilitate moving food items to the lower elevation at the edge of the food tray. Further, the tray can be tilted upwards at some angle $\beta$ to clean and otherwise maintain the surfaces of the trays and supports.

The first food tray 16, when used as a heating food tray, generally includes a heating element 34. The heating element 34 generally conducts the heating energy to the food tray. The heating element 34 is coupled to the heating outlet 20 to provide power thereto.

Further, the first food tray 16 generally includes a thermal shield 36. The thermal shield 36 can provide a thermal barrier between adjacent food trays, such as the second food tray 18, especially when the second food tray 18 is a cooling food tray. The thermal shield can also provide for better efficiency of the heating element 34 to the food surface of the first food tray 16. The thermal shield can include a variety of insulating materials including fibrous and molded natural and synthetic materials, such as fiberglass of varying densities, including high density fiberglass, phenolic resins, polymeric materials, epoxy materials, polyesters, glass materials, silicon-based materials, and other insulating materials suitable for heating applications.

Similarly, the second food tray 18 when used as a cooling food tray can include a cooling element 38A. The cooling element 38A generally conducts the cooling energy to the food tray. The cooling element 38A can be a conduit through which coolant fluid flows between the refrigeration unit 26. The cooling element 38A can be coupled to the cooling outlet 24A to facilitate the circulation from and to the refrigeration unit 26. In a similar manner, the second food tray 18 can include a thermal shield 40. The thermal shield 40 can help provide better efficiency for the cooling fluid to direct its energy toward the food surface of the second food tray 18. The thermal shield can also provide a shield from other energy, such as undesirable heat energy, particularly if the second food tray 18, if a cooling tray, is mounted above the first food tray 16, if a heating tray. The thermal shield can include a variety of insulating materials including fibrous and molded natural and synthetic materials, such as fiberglass of varying densities, including high density fiberglass, phenolic resins, polymeric materials, epoxy materials, polyesters, glass materials, silicon-based materials, expanded polystyrene, and other insulating materials suitable for cooling applications.

In the exemplary embodiment, the first food tray 16 is described and shown as a heating food tray with a heating element, and the second food tray 18 is described as a cooling food tray with a cooling element. However, it is to be understood that the location of the first food tray 16 and second food tray 18 could be at other locations such that the second food tray, if a cooling tray, is mounted at a higher elevation than the first food tray 16, if a heating tray, or vice versa, such that the lower tray could be a heating tray and the upper tray could be a cooling tray. In such embodiments, the lower heating tray could be coupled to the lower heating outlet 20A, while the higher cooling tray could be coupled to the upper cooling outlet 24 and the cooling outlet 24 could be coupled to the cooling unit 26. Thus, the exemplary embodiment is merely for descriptive purposes and can be varied, as would be known to those with ordinary skill in the art given the description herein.

Figure 6:
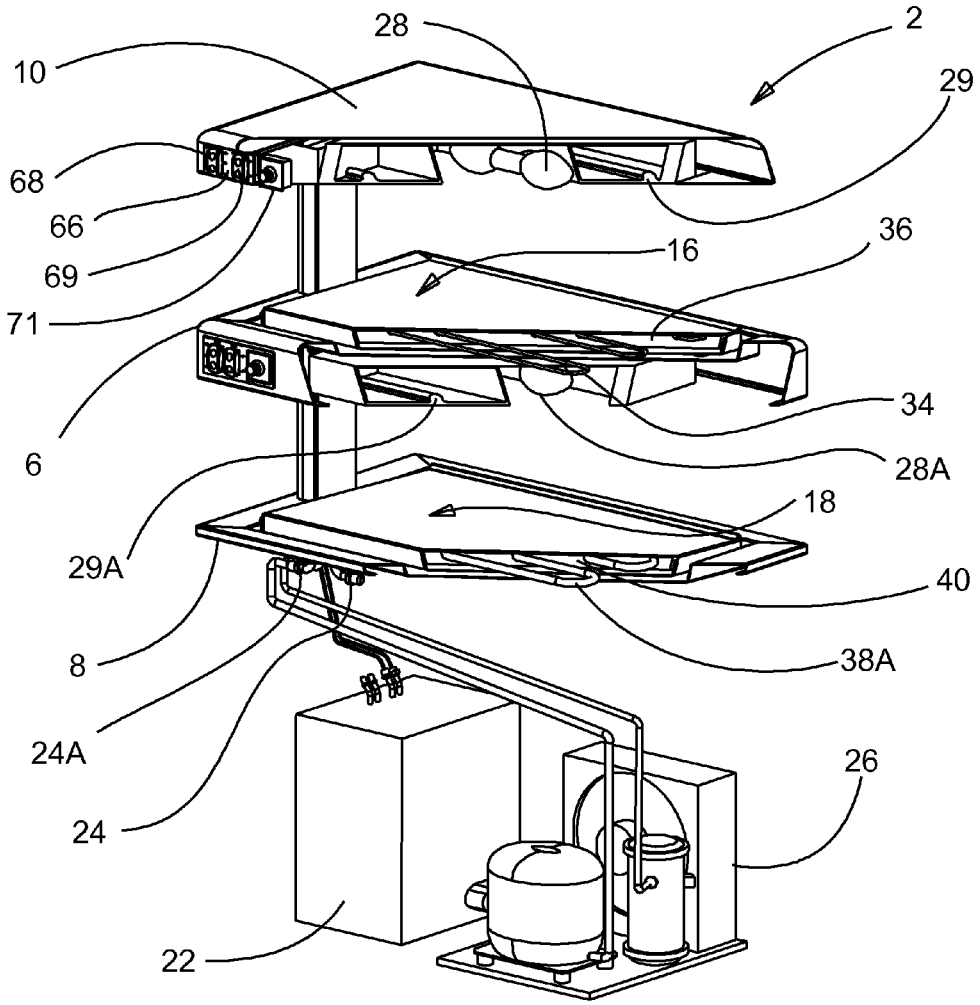
FIG. 6 is a schematic perspective cross sectional view of the exemplary food tray system.

FIG. 6 is a schematic perspective cross sectional view of the exemplary food tray system. The food tray system 2, as described above, generally includes a first tray support 6 and a second tray support 8, although the number of tray supports can vary from one to many. For each tray support, a food tray can be supported thereon. For example, the first food tray 16 can be a heating food tray and can be supported on the first tray support 6. Similarly, a second food tray 18 can be supported on the second tray support 8 and can be a cooling food tray. One or more radiant heating elements 28 can be directed toward the first food tray 16. The radiant heating elements can be mounted above the surface upon which the food can be supported by the first food tray 16. The radiant heating elements can be, for example, mounted to the top 10. One or more lights 29, 29A can be mounted above the tray supports 6, 8 respectively to illuminate items on the trays 16, 18.

The first food tray 16 can include the heating element 34 and a thermal shield 36 adjacent to the heating element 34. In at least one embodiment, the thermal shield 36 is at least partially disposed between the heating element 34 and the cooling second food tray 18. Similarly, the second food tray 18 can include a cooling element 38A and a thermal shield 40 adjacent thereto. The cooling element 38A can be coupled to the cooling outlet 24A which can be coupled to a refrigeration unit 26.

A controller 66 can control the operation of the heating and cooling aspects of the tray 16, and lights and other system elements. The controller 66 can include a switch 68 to activate the cooling element 38, a switch 69 to activate the light 29, and a switch 71 to activate the radiant heating element 28. Other combinations and purposes of the switches can be made.

Figure 6A:
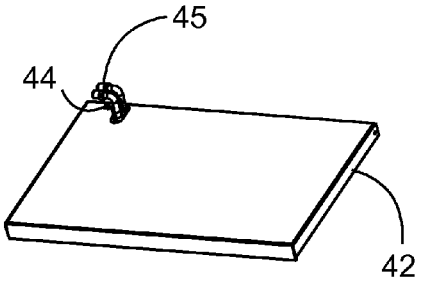
FIG. 6A is a schematic perspective view of a modular food tray.

FIG. 6A is a schematic perspective view of a modular food tray. A third food tray 42 is shown decoupled from the tray supports 6, 8. The third food tray 42 can include a temperature element 44, such as a heating element, and/or a temperature element 45, such as a cooling element. Some embodiments can include both a heating element and a cooling element. The third food tray 42 can be modularly interchangeable with the first food tray 16 and/or the second food tray 18. Depending on whether the third food tray 42 was configured as a heating food tray or a cooling food tray, the food tray system 2 could be configured with multiple heating food trays, or multiple cooling food trays, or some combination thereof. The modularity of the food tray system 2 appears unique to the present disclosure.

Figure 7:
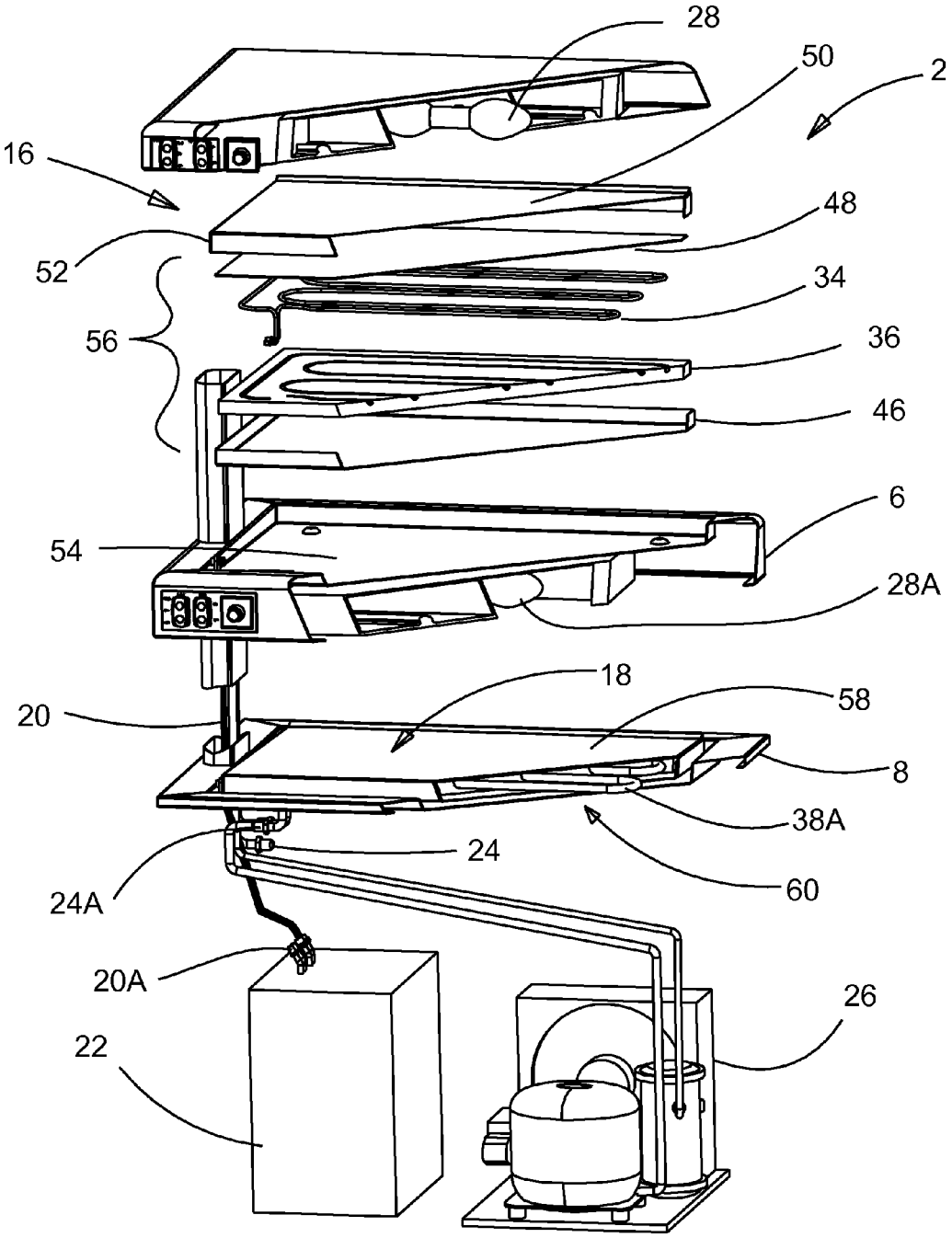
FIG. 7 is a schematic perspective cross sectional view of the food tray system showing an exemplary assembly of a food tray.

FIG. 7 is a schematic perspective cross sectional view of the food tray system showing an exemplary assembly of a food tray. An exploded view illustrates at least one exemplary assembly of a food tray and its coupling to a food tray support. For example, the first food tray 16 when designed as a heating food tray can include the heating element 34, described herein. The thermal shield 36 can be at least partially coupled to the heating element 34 to act as a thermal barrier between adjacent structures, such as the cooling food tray 18, and help direct heat energy into the food tray. The food tray 16 can further include a lower shell 46 that can protect the thermal shield 36 and an upper shell 48 that can similarly protect the upper portions of the thermal shield and in some cases, the heating element. The assembly of the upper and lower shells 46, 48, and the heating element 34 with the thermal shield 36 can be encased as a heating unit 56 and assembled to a food support 50. Thus, the heating unit 56 using the heating element 34 can conduct the heating energy to the food tray. The food support 50 is one structure upon which food can be displayed and supported, for example, to a consumer. The food support 50 can further include an extension 52 around a periphery of the food support 50. The extension 52 can be sized and designed to engage a receiver 54 formed in the first tray support 6 to allow the tray support 6 to support the food tray.

Thus, in this embodiment, the first food tray 16 generally includes two primary components, namely, a heating unit 56 that includes the thermal shield, heating elements, and upper and lower shells; and a food support 50 to which the heating unit is coupled. The first food tray 16 can be coupled to the tray support 6, for example, by use of the receiver 54.

The modularity of the food tray system is illustrated in that the second tray support 8 can be similarly designed as the first tray support 6. The second food tray 18 can include a food support 58 to which a cooling unit 60 with a similar construction as the heating unit 56 is coupled in like manner. Thus, the cooling unit 60 using the cooling element 38A can conduct the cooling energy to the food tray. A food tray can be decoupled from the heating or cooling outlet, as the case may be, and a substitute food tray inserted in place thereof. The substitute food tray can be either the same heating or cooling type of tray as the prior tray, or can be different from the prior tray, so that different combinations of food trays are possible with the food tray system.

Figure 8:
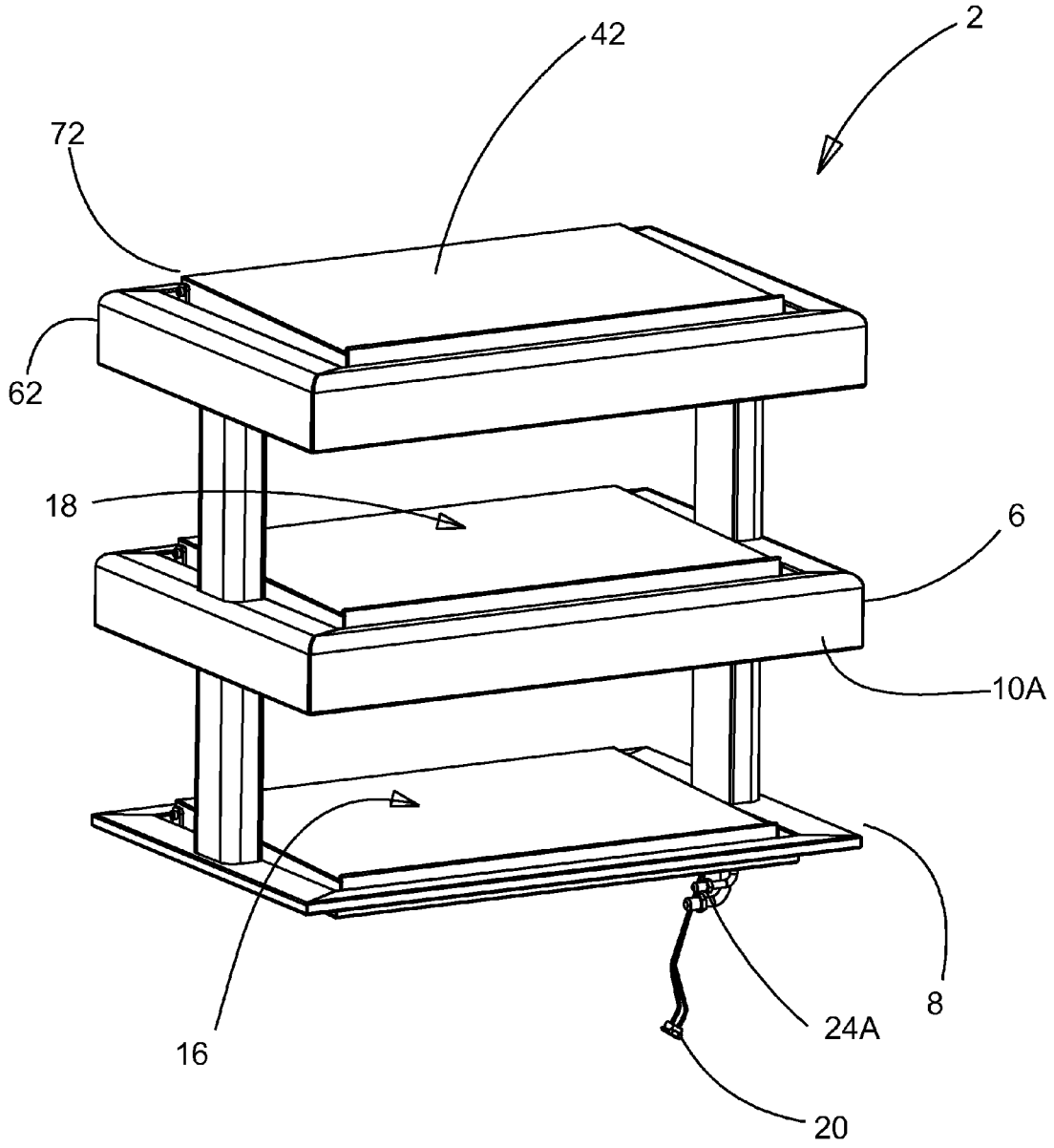
FIG. 8 is a schematic perspective view of another arrangement of the exemplary food tray system.

FIG. 8 is a schematic perspective view of another arrangement of the exemplary food tray system. In this alternative embodiment, the first tray support 6 supports the second food tray 18 which can be a cooling food tray, as described herein. The second tray support 8 conversely can support the first food tray 16 which could be a heating food tray, as described herein. Further, the third food tray 42 could be disposed above the first tray support 6 on a third tray support 62. In like manner, the third tray support can support a radiant heat element, light, and other equipment. A bottom 10A of the first tray support 6 could be used to support one or more radiant heating elements (not shown) as has been described above to direct radiant energy toward the heating first food tray 16 disposed therebelow.

Figure 9:
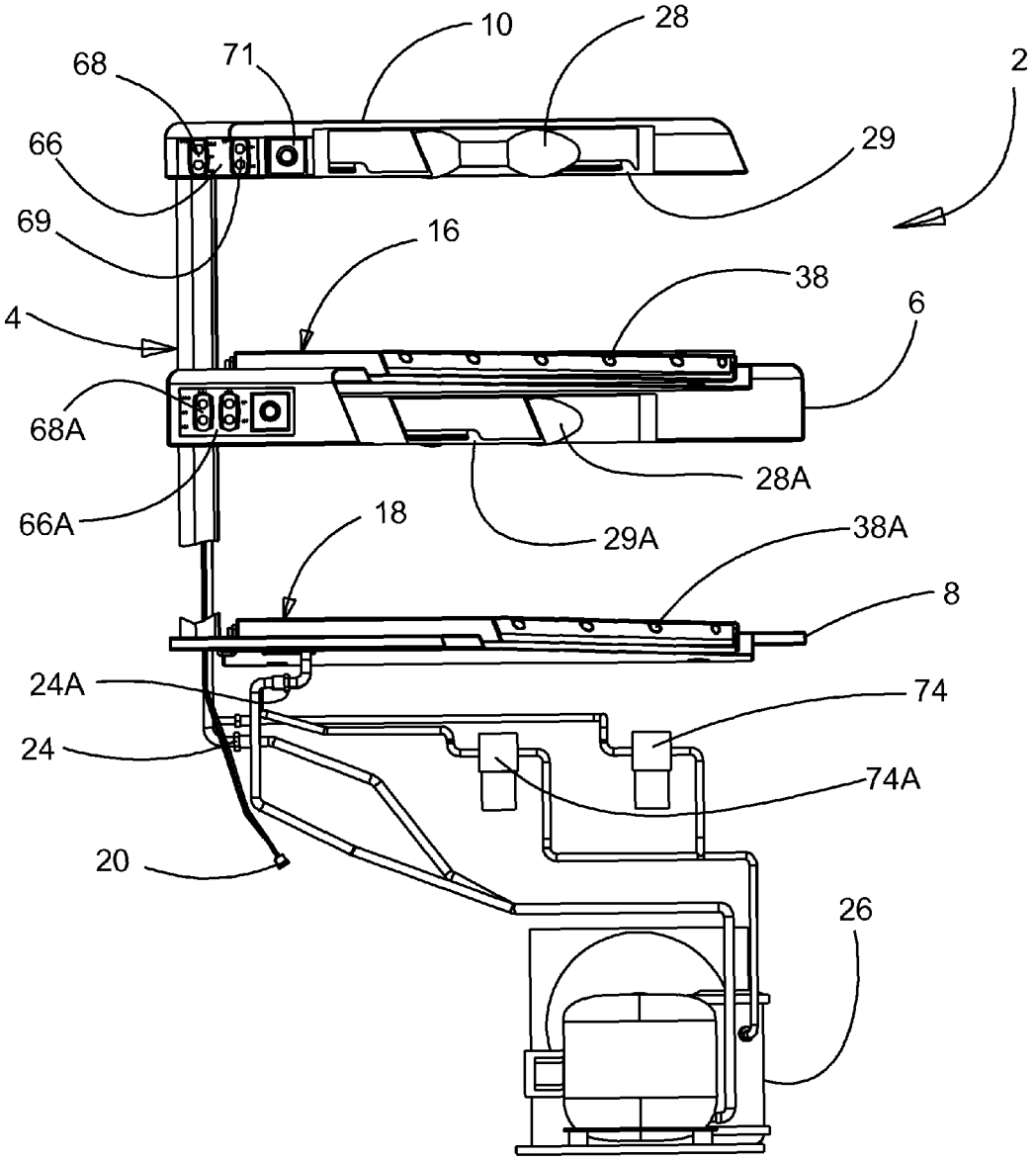
FIG. 9 is a schematic side view of another exemplary embodiment of the food tray system.
Figure 10:
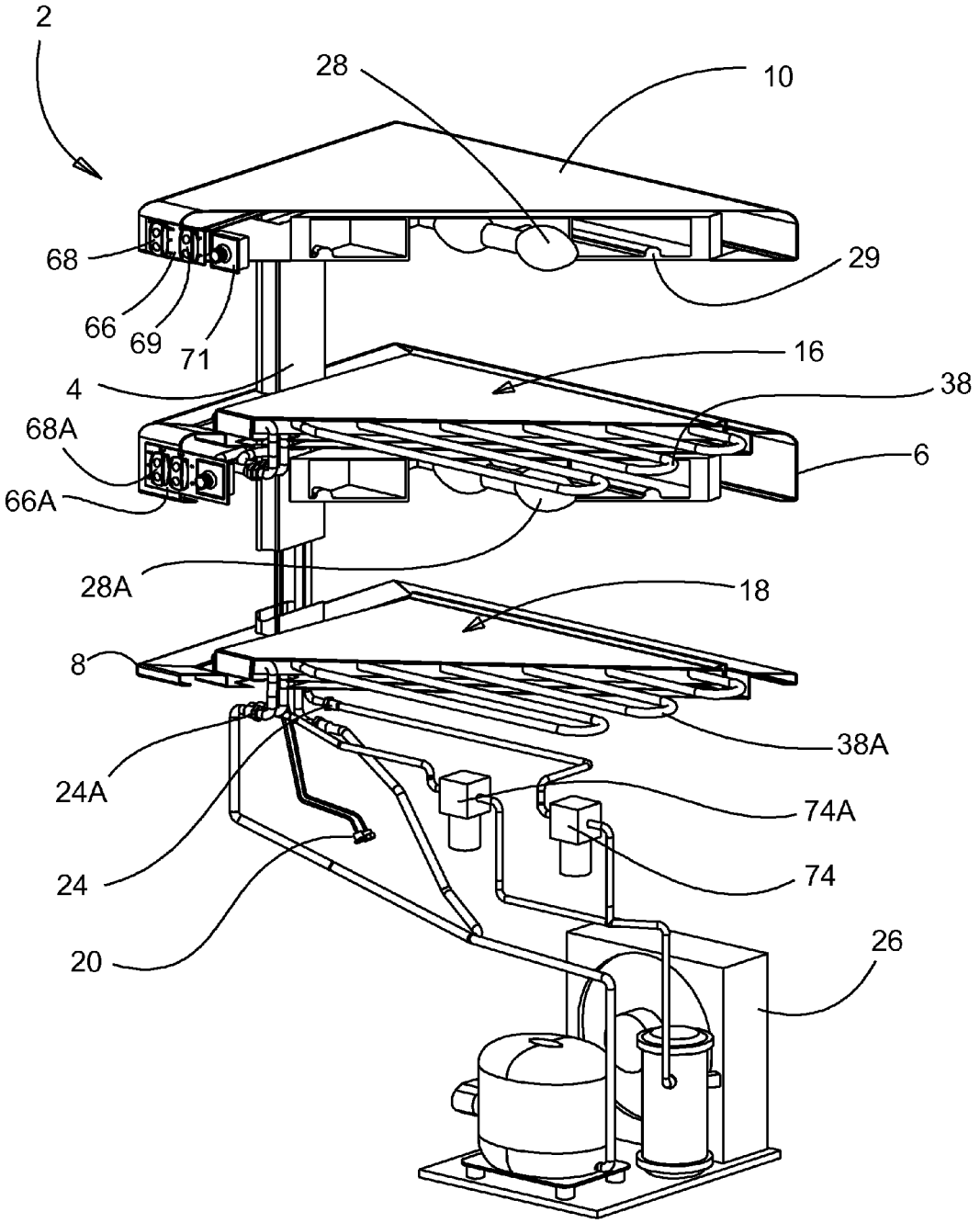
FIG. 10 is a schematic perspective view of the exemplary embodiment of FIG. 9.

FIG. 9 is a schematic side view of another exemplary embodiment of the food tray system. FIG. 10 is a schematic perspective view of the exemplary embodiment of FIG. 9. The figures will be described in conjunction with each. Similar elements that are similarly numbered have been described above. In this embodiment, one of more of the food trays can be a cooling food tray with a cooling element coupled thereto. However, the food tray can operate as a heating food tray with heat energy primarily being applied through one or more of the radiant heating elements 28, 28A. Thus, a heating element directly coupled to the food tray may be unnecessary, depending on the desired heating temperature. It is believed that this combination is unique to the present disclosure. Thus, the same food tray can be used in dual modes as a cooling food tray and a heating tray. When the cooling element is activated, and the radiant heating element is deactivated, then the food tray can serve as a cooling food tray. When the cooling element is deactivated, and the radiant heating element is activated, then the food tray can serve as a heating food tray. In at least one embodiment, a multi-position switch can be used to toggle between multiple modes of operation, described below.

More particularly, the system 2 generally includes the support structure with at least one food tray 16 with a cooling element 38 coupled to the food tray. The refrigeration unit 26 can provide refrigerant or other coolant through the cooling outlet 24 to the cooling element 38. As described above, the first food tray 16 can be coupled to the first tray support 6.

A controller 66 can control the activation and deactivation of the cooling element 38, the radiant heating element 28, or a combination thereof. In at least one embodiment, a switch 68 can be used to control such activation. The switch 68 can be coupled to the controller 66. The controller 66 can likewise be coupled to the refrigeration unit 26. The switch can include, among other switches, an electrical switch, a solenoid valve, a pneumatic or hydraulic valve, a manual valve or other control components as would be known to those with ordinary skill in the arts given the disclosure herein. For example, the switch 68 could be a multi-position switch with a first position to activate the cooling element and deactivate the heating element, a second position to deactivate the cooling element and heating element, and a third position to deactivate the cooling element and activate the heating element. Such embodiment would generally avoid concurrent activation of the cooling element and heating element on the same tray.

In at least one mode, the controller 66 can deactivate the cooling element 38 with the switch 68 and activate the radiant heating element 28 with the switch 71. In this mode, the first food tray 16 can be used as a heating food tray in that food disposed thereon can be heated using the radiant heating element 28, instead of the heating element, as has been described herein. Alternatively, the radiant heating element 28 can be deactivated to avoid heating the food and the cooling element 38 can be activated, so that the food tray 16 can be used as a cooling food tray. The switches 68 and/or 71 could be adjustable switches to vary the intensity of the cooling and/or heating.

A similar arrangement can be made for the second food tray 18 coupled to the second tray support 8. If the system has additional food trays, such as the second food tray 18, the food trays can be coupled with a corresponding cooling elements 38A in like manner. The cooling element 38A can be coupled to a cooling outlet 24A which in turn can be coupled to a switch 68A, as has been described above regarding switch 68, and to the refrigeration unit 26. A controller 66A can likewise control the switch 68A. The second food tray can be used in like manner as a dual mode tray in that the cooling element 38A could be deactivated while a radiant heating element 28A could be activated to direct heat energy toward the second food tray 18. The second food tray 18 would be used as a heating food tray in such mode. Alternatively, the radiant heating element 28A could be deactivated and the cooling element 38A activated, so that the second cooling tray 18 could be used as a cooling food tray.

The controllers 66, 66A could be also designed to activate one food tray as a heating food tray and the other food tray as a cooling food tray, where such activation could include either of the food trays 16, 18. Thus, the food tray combinations of heating and cooling food trays in the illustrated food tray system 2 are: the first food tray 16 could be a heating food tray with the second food tray 18 being a heating food tray; the first food tray 16 could be a cooling food tray with the second food tray 18 being a cooling food tray; the first food tray 16 could be a heating food tray with the second food tray being a cooling food tray; and the first food tray could be a cooling food tray with the second food tray being a heating food tray. For other numbers of food trays, different combinations are envisioned. One or more valves 74, 74A can be controlled to open and close the cooling outlets 24, 24A, and more generally a cooling circuit to the cooling elements 38, 38A in the trays 16, 18.

Figure 11:
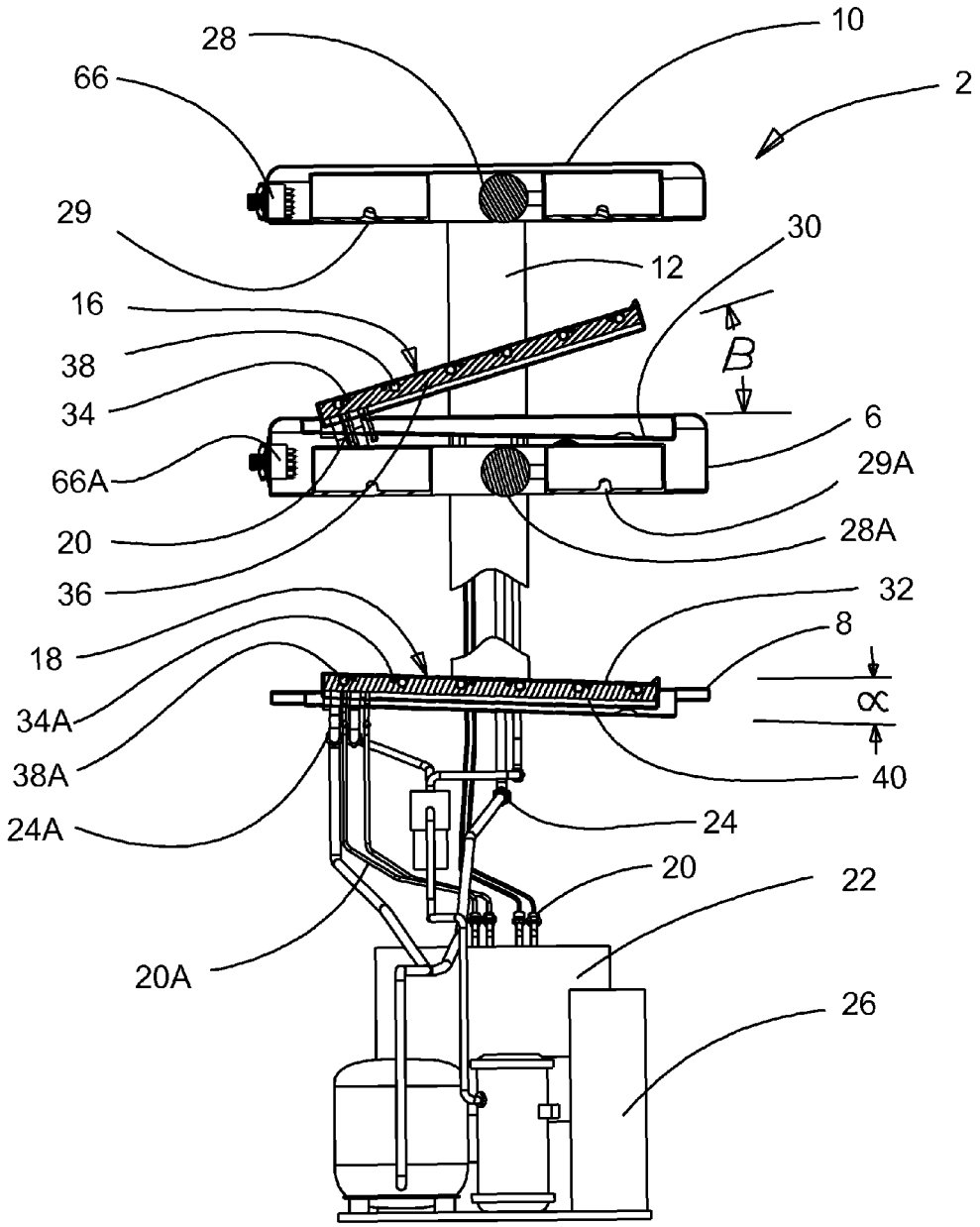
FIG. 11 is a schematic cross sectional view of another embodiment of the exemplary food tray system.
Figure 12:
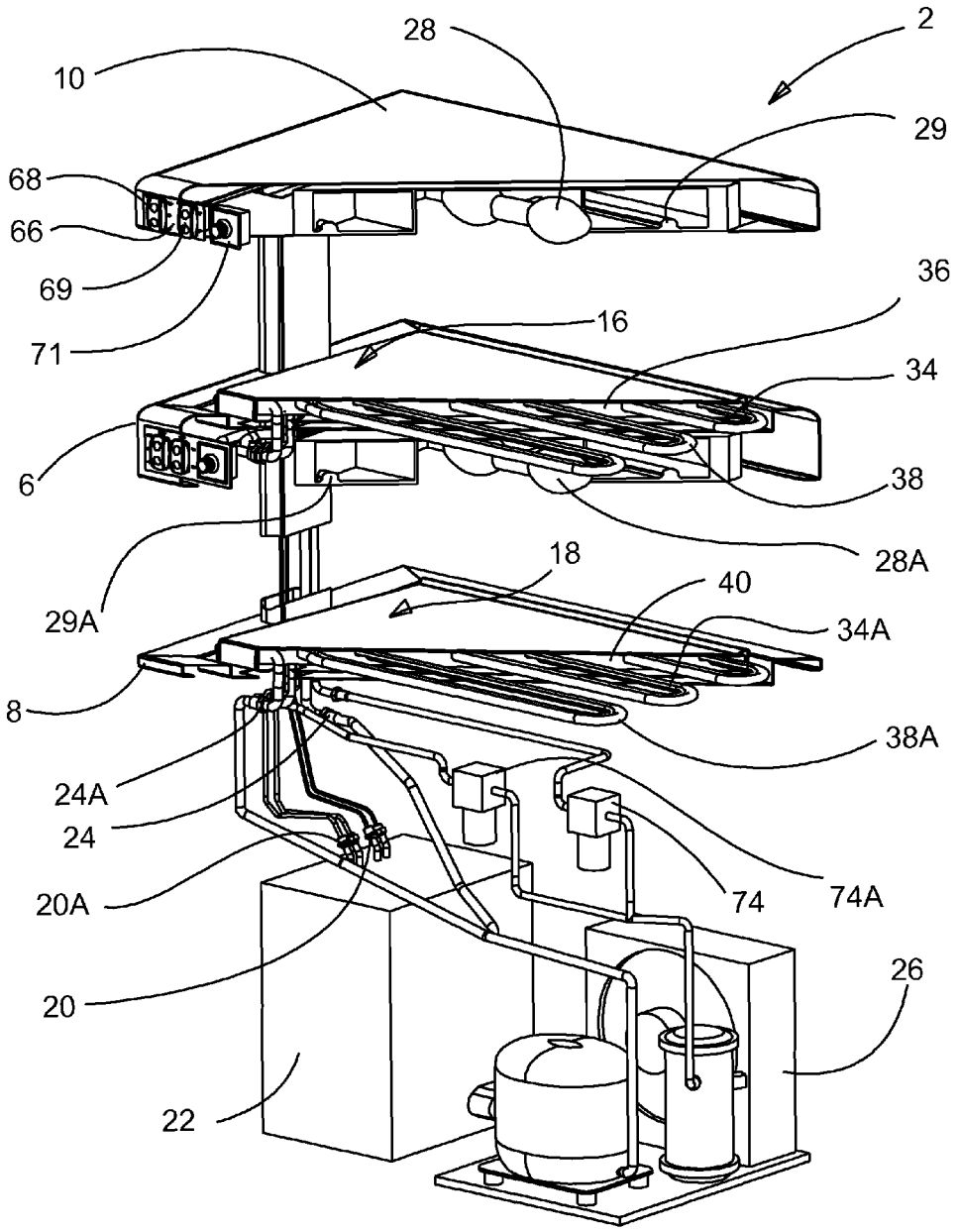
FIG. 12 is a schematic perspective cross sectional view of the exemplary food tray system of FIG. 11.
Figure 13:
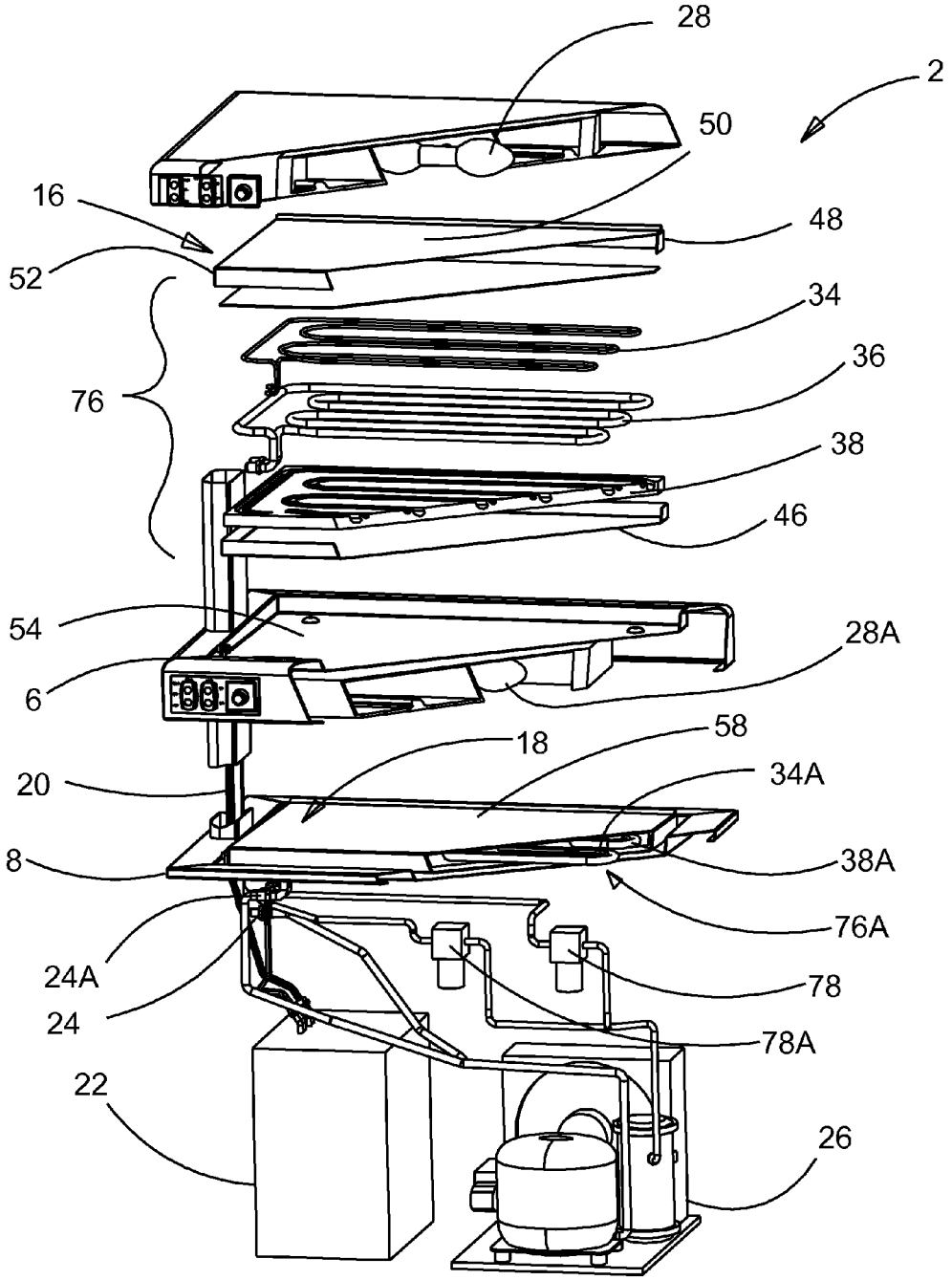
FIG. 13 is a schematic perspective cross sectional view of the food tray system showing an exemplary assembly of a food tray of FIG. 11.

FIG. 11 is a schematic cross sectional view of another embodiment of the exemplary food tray system. FIG. 12 is a schematic perspective cross sectional view of the exemplary food tray system of FIG. 11. FIG. 13 is a schematic perspective cross sectional view of the food tray system showing an exemplary assembly of a food tray of FIG. 11. FIGS. 11-13 will be described in conjunction with each other. Similar elements as described above are similarly numbered. In this embodiment, one or more of the trays can include both a heating element and a cooling element. A controller can control the operation of the heating element and the cooling element in the one or more trays.

More particularly, one or more food trays 16, 18 can include one or more combination units 76, 76A that can include both a heating element 38, 38A and a cooling element 36, 36A. A thermal shield, such as the thermal shield 36 also described above can be used in conjunction with the heating element and cooling element in the combination unit. Similarly, a lower shell 46 and an upper shell 48 can protect the thermal shield and the heating element and cooling element. The assembly of the upper and lower shells and the heating and cooling elements with the thermal shield 36 can be encased as the combination units 76, 76A unit 56 and assembled to a food support 50. The food support 50 is one structure upon which food can be displayed and supported, for example, to a consumer. The food support 50 can further include an extension 52 around a periphery of the food support 50. The extension 52 can be sized and designed to engage a receiver 54 formed in one or more of the first tray supports 6, 8 to allow the tray supports to support the food trays.

The controller 66 can include a switch 68 to activate the cooling element 38, a switch 69 to activate the light 29, and a switch 71 to activate the radiant heating element 28. Other combinations and purposes of the switches can be made. The switch 68 could be a multi-position switch with a first position to activate the cooling element and deactivate the heating element, a second position to deactivate the cooling element and heating element, and a third position to deactivate the cooling element and activate the heating element. Such embodiment would generally avoid concurrent activation of the cooling element and heating element on the same tray. One or more valves 78, 78A, similar to valves 74, 74A in FIG. 9, can be controlled to open and close the cooling outlets 24, 24A, and more generally a cooling circuit to the cooling elements 38, 38A in the trays 16, 18.

The term "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and can further include without limitation integrally forming one functional member with another in a unity fashion. The coupling can occur in any direction, including rotationally.

The arrangements described herein are exemplary only and illustrate some variations. However, it is expressly understood that other variations are possible given the teachings described herein. The claims are not limited to the exact arrangements of the food trays and food tray supports. Rather, the arrangements can be varied as appropriate for given applications, so that the food trays can be different or the same with varying numbers and varying locations. However, the dual use capabilities of both heating and cooling as well as modularity of the system gives flexibility to the food tray system.

The invention has been described in the context of various embodiments and not every embodiment of the invention has been described. Apparent modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect all such modifications and improvements to the full extent that such falls within the scope or range of equivalent of the following claims.

The various methods and embodiments of the invention can be included in combination with each other to produce variations of the disclosed methods and embodiments, as would be understood by those with ordinary skill in the art, given the understanding provided herein. Also, various aspects of the embodiments could be used in conjunction with each other to accomplish the understood goals of the invention. Also, the directions such as "top," "bottom," "left," "right," "upper," "lower," and other directions and orientations are described herein for clarity in reference to the figures and are not to be limiting of the actual device or system or use of the device or system. Unless the context requires otherwise, the word "comprise" or variations such as "comprises" or "comprising", should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. Further, the order of steps can occur in a variety of sequences unless otherwise specifically limited. The various steps described herein can be combined with other steps, interlineated with the stated steps, and/or split into multiple steps. Additionally, the headings herein are for the convenience of the reader and are not intended to limit the scope of the invention.

Further, any references mentioned in the application for this patent as well as all references listed in the information disclosure originally filed with the application are hereby incorporated by reference in their entirety to the extent such may be deemed essential to support the enabling of the invention. However, to the extent statements might be considered inconsistent with the patenting of the invention, such statements are expressly not meant to be considered as made by the Applicant.

The invention claimed is:

1. A temperature controlled food tray system, comprising:

a first food tray mounted on a top surface of a first tray support, the first food tray having an uppermost surface adapted to support food thereon and a cooling element that, when activated, cools the first food tray independent of whether airflow is present in the system;

wherein the cooling element is disposed between the uppermost surface of the first food tray and the top surface of the first tray support and is configured to have cooling fluid circulated there through;

a cooling outlet fluidicly coupled to the cooling element of the first food tray;

at least one radiant heating element coupled above the first food tray that, when activated, directs radiant heat toward the uppermost surface of the first food tray; and at least one controller, the at least one controller being configured to activate the radiant heating element and to deactivate the cooling element of the first food tray to thereby operate the first food tray as a heating food tray, the at least one controller being further configured to deactivate the radiant heating element and to activate the cooling element of the first food tray to thereby operate the first food tray as a cooling food tray.

2. The system of claim 1, further comprising:

a second food tray with a cooling element coupled to the second food tray, the second food tray being coupled to the first food tray; and a refrigeration unit fluidicly coupled to the cooling element of at least one of the first and second food trays.

3. The system of claim 2, further comprising:

at least one radiant heating element directed toward the second food tray; and the at least one controller being further adapted to activate the radiant heating element directed toward the second food tray and deactivate the cooling element of the second food tray.

4. The system of claim 3, wherein the at least one controller is adapted to activate the cooling element of the first food tray or the second food tray.

5. The system of claim 2, wherein the first food tray is disposed above the second food tray in elevation.

6. The system of claim 2, wherein the first food tray is disposed below the second food tray in elevation.

7. The system of claim 2, wherein one or more of the food trays are modular.

8. The system of claim 2, further comprising a second tray support adapted to support the second food tray and a support structure comprising at least one upright member, the first and second tray supports being coupled to the upright member.

9. The system of claim 1, further comprising a heating element coupled to the first food tray and wherein the at least one controller is adapted to activate the cooling element and deactivate the heating element to operate the first food tray as a cooling food tray, and to deactivate the cooling element and activate the heating element to operate the first food tray as a heating food tray.

10. The system of claim 2, further comprising a heating element coupled to the second food tray and wherein the at least one controller is adapted to activate the cooling element and deactivate the heating element to operate the second food tray as a cooling food tray, and to deactivate the cooling element and activate the heating element to operate the second food tray as a heating food tray.

11. The system of claim 2, further comprising a thermal shield coupled to the first food tray, the second food tray, or a combination thereof.

12. The system of claim 1, further comprising a support structure coupled to the first food tray and a plurality of heating outlets adapted to be coupled with a plurality of heating elements, a plurality of cooling outlets adapted to be coupled with a plurality of cooling elements, or a combination thereof, the outlets being disposed along the support structure.

13. A temperature controlled food tray system, comprising:

an upright structure having a heating outlet and a cooling outlet;

*a first tray support;*

*a second tray support;* a first food tray with a *first* heating element that provides heating energy to an uppermost surface of the first food tray*, the uppermost surface of the first food tray comprising a food support surface configured to support food for display to consumers*, the *first* heating element being disposed between the uppermost surface of the first food tray and a top surface of [a] *the* first tray support[to which], the first food tray [is] *being* coupled *to the first tray support*; and a second food tray with a *first* cooling element that provides cooling energy to an uppermost surface of the second food tray*, the uppermost surface of the second food tray comprising a food support surface configured to support food for display to consumers*, the *first* cooling element being disposed between the uppermost surface of the second food tray and a top surface of [a] *the* second tray support[to which], the second food tray [is] *being* coupled *to the second tray support*;

wherein the first tray support is mounted to the upright structure and the *first* heating element is coupled to the heating outlet;

wherein the second tray support is mounted to the upright structure;

wherein the *first* cooling element is fluidicly coupled to the cooling outlet, the second food tray thereby being configured to have cooling fluid from a source of cooling energy circulated there through; [and]

wherein the heating element and the cooling element *are configured to* operate independently *of one another; and*

*wherein the first food tray is disposed above the second food tray or the second food tray is disposed above the first food tray.*

14. The system of claim 13, wherein the first food tray is disposed above the second food tray in elevation.

15. The system of claim 13, wherein the first food tray is disposed below the second food tray in elevation.

16. The system of claim 13, wherein one or more of the food trays are modular.

17. The system of claim 16, further comprising a third food tray adapted to replace the first food tray, the third food tray being a cooling tray.

18. The system of claim 16, further comprising a third food tray adapted to replace the second food tray, the third food tray being a heating tray.

19. The system of claim 13, further comprising a support structure coupled to at least one of the food trays and a plurality of heating outlets adapted to be coupled with a plurality of heating elements, a plurality of cooling outlets adapted to be coupled with a plurality of cooling elements, or a combination thereof, the outlets being disposed along the support structure.

20. The system of claim 13, further comprising a *second* cooling element coupled to the first food tray to form a combination unit, and wherein the first food tray is adapted to be operated as a heating tray or a cooling tray.

21. The system of claim 13, further comprising a *second* heating element coupled to the second food tray to form a combination unit, and wherein the second food tray is adapted to be operated as a heating tray or a cooling tray.

22. The system of claim 13, further comprising a thermal shield coupled to the first food tray, the second food tray, or a combination thereof.

23. The system of claim 13, further comprising a radiant heating element disposed above the first food tray and adapted to heat food items disposed on the first food tray.

24. The system of claim 23, further comprising a canopy having a structure above the first food tray.

25. The system of claim 13, wherein the food trays are coupled to a counter to support the food trays.

26. The system of claim 13, wherein the first food tray comprises a food support and a heating unit.

27. The system of claim 13, wherein the second food tray comprises a food support and a cooling unit.

28. A temperature controlled food tray system, comprising:

a support structure comprising at least one upright member and at least a first tray support and a second tray support, the tray supports being coupled to the upright member and spaced vertically from one another;

at least one cooling outlet configured to couple to a food tray having a cooling element and provide cooling fluid into the food tray;

at least one heating outlet configured to couple to a food tray having a heating element;

a first food tray mounted on a top surface of the first tray support and removably coupled to a first of the at least one heating outlet, the at least one cooling outlet, or a combination thereof;

a second food tray mounted on a top surface of the second tray support and removably coupled to a second of the at least one heating outlet, the at least one cooling outlet, or a combination thereof, the first and second food trays being interchangeably coupled to the first and second tray supports; and at least one controller that selectively activates or deactivates one or more of the at least one heating and cooling outlets;

wherein at least one of the first and second food trays includes a cooling element configured to have cooling fluid from a source of cooling energy circulated there through, the cooling element being disposed between an uppermost surface of the at least one food tray and the top surface of the tray support to which the at least one food tray is coupled.

29. The system of claim 28, wherein the first food tray is coupled with a heating element and the second food tray is coupled with a cooling element.

30. The system of claim 29, further comprising a third food tray coupled with a cooling element and adapted to replace the first food tray.

31. The system of claim 29, further comprising a third food tray coupled with a heating element and adapted to replace the second food tray.

32. The system of claim 28, further comprising a refrigeration unit coupled to the at least one cooling outlet.

33. The system of claim 28, further comprising a plurality of heating outlets, a plurality of cooling outlets, or a combination thereof, the outlets being disposed along the support structure.

34. The system of claim 28, wherein the first food tray is disposed above the second food tray in elevation.

35. The system of claim 28, wherein the first food tray is disposed below the second food tray in elevation.

36. The system of claim 28, wherein at least one of the first food tray and second food tray comprises a heating element and a cooling element and is configured to be selectively activated and operated as a heating tray or a cooling tray.

37. The system of claim 28, further comprising a thermal shield coupled to the first food tray, the second food tray, or a combination thereof.

38. The system of claim 28, further comprising a canopy disposed over the first food tray having a radiant heating element adapted to heat food items disposed on the first food tray.

39. The system of claim 28, wherein the food trays are coupled to a counter to support the food trays.

40. The system of claim 28, wherein the first food tray comprises a food support and a heating unit.

41. The system of claim 28, wherein the second food tray comprises a food support and a cooling unit.

42. The system of claim 28, wherein the second food tray is configured to have cooling fluid from a source of cooling energy circulated there through, and further comprising a heating element coupled to the second food tray to form a combination unit, and wherein the second food tray is adapted to be selectively operated as a heating tray or a cooling tray independently from the first food tray.

43. The system of claim 1, further comprising a hinge joint coupled to the first food tray, the first food tray being adapted to rotate about the hinge joint relative to the first tray support.

*44. The system of claim 13, wherein the food support surface of the first food tray is visible from a front and a rear of the system.*

*45. The system of claim 13, wherein the food support surface of the second food tray is visible from a front and a rear of the system.*

*46. The system of claim 45, wherein the food support surface of the first food tray is visible from the front and the rear of the system.*

*47. The system of claim 13, further comprising a first space above the first food tray providing access to the food support surface of the first food tray.*

*48. The system of claim 47, wherein the first space provides access to the food support surface of the first food tray from a front of the first space.*

*49. The system of claim 47, wherein the first space provides access to the food support surface of the first food tray from a rear of the first space.*

*50. The system of claim 49, wherein the first space provides access to the food support surface of the first food tray from a front of the first space.*

*51. The system of claim 47, wherein the first space provides unobstructed access to the food support surface of the first food tray from a front of the first space.*

*52. The system of claim 47, wherein the first space provides unobstructed access to the food support surface of the first food tray from a rear of the first space.*

*53. The system of claim 52, wherein the first space provides unobstructed access to the food support surface of the first food tray from a front of the first space.*

*54. The system of claim 47, wherein the first space is in open communication with ambient air adjacent the system.*

*55. The system of claim 54, wherein a front of the first space is open to the ambient air in front of the system.*

*56. The system of claim 54, wherein a rear of the first space is open to the ambient air behind the system.*

*57. The system of claim 56, wherein a front of the first space is open to the ambient air in front of the system.*

*58. The system of claim 13, further comprising a second space above the second food tray providing access to the food support surface of the second food tray.*

*59. The system of claim 58, wherein the second space provides access to the food support surface of the second food tray from a front of the second space.*

*60. The system of claim 58, wherein the second space provides access to the food support surface of the second food tray from a rear of the second space.*

*61. The system of claim 60, wherein the second space provides access to the food support surface of the second food tray from a front of the second space.*

*62. The system of claim 58, wherein the second space provides unobstructed access to the food support surface of the second food tray from a front of the second space.*

*63. The system of claim 58, wherein the second space provides unobstructed access to the food support surface of the second food tray from a rear of the second space.*

*64. The system of claim 63, wherein the second space provides unobstructed access to the food support surface of the second food tray from a front of the second space.*

*65. The system of claim 58, wherein the second space is in open communication with ambient air adjacent the system.*

*66. The system of claim 65, wherein a front of the second space is open to the ambient air in front of the system.*

*67. The system of claim 65, wherein a rear of the second space is open to the ambient air behind the system.*

*68. The system of claim 67, wherein a front of the second space is open to the ambient air.*

*69. The system of claim 47, further comprising a second space above the second food tray providing access to the food support surface of the second food tray.*

*70. The system of claim 48, further comprising a second space above the second food tray providing access to the food support surface of the second food tray from a front of the second space.*

*71. The system of claim 49, further comprising a second space above the second food tray providing access to the food support surface of the second food tray from a rear of the second space.*

*72. The system of claim 50, further comprising a second space above the second food tray providing access to the food support surface of the second food tray from a front and a rear of the second space.*

*73. The system of claim 51, further comprising a second space above the second food tray providing unobstructed access to the food support surface of the second food tray from a front of the second space.*

*74. The system of claim 52, further comprising a second space above the second food tray providing unobstructed access to the food support surface of the second food tray from a rear of the second space.*

*75. The system of claim 53, further comprising a second space above the second food tray providing unobstructed access to the food support surface of the second food tray from a front and a rear of the second space.*

*76. The system of claim 54, further comprising a second space above the second food tray in open communication with the ambient air.*

*77. The system of claim 55, further comprising a second space above the second food tray, a front of the second space being open to the ambient air in front of the system.*

*78. The system of claim 56, further comprising a second space above the second food tray, a rear of the second space being open to the ambient air behind the system.*

*79. The system of claim 57, further comprising a second space above the second food tray, a front and a rear of the second space being open to the ambient air in front of and behind the system, respectively.*

*80. The system of claim 13, wherein the upright structure includes a first upright member, the first and second tray supports being directly mounted to the first upright member.*

*81. The system of claim 80, wherein the upright structure includes a second upright member, the first and second tray supports being directly mounted to the first upright member.*

*82. The system of claim 13, wherein an elevation of the first tray support relative to an elevation of the second tray support is fixed.*

*83. The system of claim 82, wherein the first food tray is directly coupled to the first tray support and the second food tray is directly coupled to the second tray support.*

*84. The system of claim 13, wherein the first tray support surrounds a perimeter of the first food tray and the second tray support surrounds a perimeter of the second food tray.*

*85. The system of claim 13, wherein the first tray support includes a top wall defining a first opening, the first food tray is disposed in the opening of the first tray support, and wherein the second tray support includes a top wall defining a second opening, the second food tray being disposed in the opening of the second tray support.*

*86. The system of claim 13, wherein the first tray support defines a first recess, the first food tray disposed in the first recess, and wherein the second tray support defines a second recess, the second food tray disposed in the second recess.*

*87. The system of claim 13, further comprising a first channel extending around a perimeter of the first food tray, and a second channel extending around a perimeter of the second food tray.*

*88. The system of claim 87, wherein the first channel is bounded by the first food tray and the first tray support, and wherein the second channel is bounded by the second food tray and the second tray support.*

*89. The system of claim 13, wherein the first tray support and the second tray support have vertically aligned footprints.*

*90. The system of claim 13, wherein the upright structure includes a first upright member and a second upright*

*member, the first upright member being adjacent to a first side of the first tray support and adjacent to a first side of the second tray support, the second upright member being adjacent to a second side of the first tray support and adjacent to a second side of the second tray support.*

*91. The system of claim 90, wherein the first upright member engages the first tray support and the second tray support, and wherein the second upright member engages the first tray support and the second tray support.*

*92. The system of claim 90, wherein the first tray support is disposed above the second tray support, the first tray support including a bottom and the second tray support including a top face, the first and second upright members extending upward from the top face of the second tray support to the bottom of the first tray support.*

*93. The system of claim 90, wherein the second tray support is disposed above the first tray support, the second tray support including a bottom and the first tray support including a top face, the first and second upright members extending upward from the top face of the first tray support to the bottom of the second tray support.*

*94. The system of claim 90, wherein the first and second upright members are spaced rearward of a front of the food support surface of the first tray and the first and second upright members are spaced forward of a rear of the food support surface of the first tray.*

*95. The system of claim 94, wherein the first and second upright members each include a front side and a rear side, wherein a distance between the front and rear sides of the first upright member is less than a distance between a front of the food support surface of the first food tray and the front side of the first upright member and is less than a distance between a rear of the food support surface of the first food tray and the rear side of the first upright member, and wherein a distance between the front and rear sides of the second upright member is less than a distance between the front of the food support surface of the first food tray and the front side of the second upright member and is less than a distance between the rear of the food support surface of the first food tray and the rear side of the second upright member.*

*96. The system of claim 13, wherein the first food tray includes a second cooling element and the second food tray includes a second heating element, the system further comprising a first controller, the first controller configured to selectively activate and deactivate the first heating element and the second cooling element independent of the second heating element and the first cooling element to selectively operate the first food tray in a heating mode or a cooling mode regardless of a temperature status of the second food tray.*

*97. The system of claim 96, further comprising a second controller configured to selectively activate and deactivate the second heating element and the first cooling element independent of the first heating element and the second cooling element to selectively operate the second food tray in a heating mode or a cooling mode regardless of a temperature status of the first food tray.*

*98. The system of claim 97, wherein the first controller is configured to prevent concurrent activation of the first heating element and the second cooling element, and wherein the second controller is configured to prevent concurrent activation of the second heating element and the first cooling element.*

*99. The system of claim 97, wherein the first controller comprises a first multi-position electrical switch and the second controller comprises a second multi-position electrical switch.*

*100. The system of claim 99, wherein each of the first and second multi-position electrical switches has a respective first position, a second position, and a third position, wherein the first multi-position switch is configured to activate the second cooling element and deactivate the first heating element in the first position, activate the first heating element and deactivate the second cooling element in the second position, and deactivate the second cooling element and the first heating element in the third position, and wherein the second multi-position switch is configured to activate the first cooling element and deactivate the first heating element in the first position, activate the second heating element and deactivate the first cooling element in the second position, and deactivate the first cooling element and the first heating element in the third position.*

*101. The system of claim 97, wherein the first controller comprises a first adjustable switch and the second controller comprises a second adjustable switch, the first adjustable switch configured to adjust a heating intensity of the first heating element, the second adjustable switch configured to adjust a heating intensity of the second heating element.*

*102. The system of claim 13, wherein the first food tray includes a first thermal shield underlying the first heating element and the second food tray includes a second thermal shield underlying the first cooling element.*

*103. The system of claim 102, wherein the first food tray includes a second cooling element and the second food tray includes a second heating element, the first thermal shield underlying the second cooling element and the second thermal shield underlying the second heating element.*

*104. The system of claim 103, wherein the first food tray includes a bottom wall, the first heating element, the second cooling element, and the first thermal shield being disposed between the food support surface of the first food tray and the bottom wall of the first food tray, and wherein the second food tray includes a bottom wall, the first cooling element, the second heating element, and the second thermal shield being disposed between the food support surface of the second food tray and the bottom wall of the second food tray.*

*105. The system of claim 13, wherein the food support surface of the first food tray is planar and the food support surface of the second food tray is planar.*

*106. The system of claim 13, wherein the food support surface of the first food tray is laterally offset inboard from a top face of the first tray support, and wherein the food support surface of the second food tray is laterally offset inboard from a top face of the second tray support.*

*107. The system of claim 13, wherein the first food tray includes a first extension around a periphery of the food support surface of the first food tray, and wherein the second food tray includes a second extension around a periphery of the food support surface of the second food tray.*

*108. The system of claim 107, wherein the first extension includes a front wall, a first side wall extending downward from a first side edge of the food support surface of the first food tray, a second side wall extending downward from a second side edge of the food support surface of the first food tray, and a rear wall extending downward from a rear edge of the food support surface of the first food tray, and wherein the second extension includes a front wall, a first side wall extending downward from a first side edge of the food support surface of the second food tray, a second side wall extending downward from a second side edge of the food*

*support surface of the second food tray, and a rear wall extending downward from a rear edge of the food support surface of the second food tray.*

*109. The system of claim 108, wherein the first heating element is disposed between the front and rear walls of the first extension and the between the first and second side walls of the first extension, and wherein the first cooling element is disposed between the front and rear walls of the second extension and the between the first and second side walls of the second extension.*

*110. The system of claim 108, wherein the first food tray includes a first lip extending upward from a front edge of the food support surface of the first food tray, and the second food tray includes a second lip extending upward from a front edge of the food support surface of the second food tray.*

*111. The system of claim 69, wherein the first food tray and the first tray support bound a bottom of the first space, and wherein the second food tray and the second tray support bound a bottom of the second space.*

*112. The system of claim 111, wherein the second food tray bounds a top of the first space, a front of the first space extending between the first and second tray supports and a rear of the first space extending between the first and second tray supports.*

*113. The system of claim 111, wherein the first food tray bounds a top of the second space, a front of the second space extending between the first and second tray supports and a rear of the second space extending between the first and second tray supports.*

*114. The system of claim 13, wherein the upright structure comprises a counter having a countertop, the countertop supporting the first and second tray supports.*

*115. The system of claim 114, wherein the first tray support or the second tray support engages the countertop.*

*116. The system of claim 114, wherein the food support surface of the first food tray is disposed above a top of the countertop.*

*117. The system of claim 114, wherein the food support surface of the second food tray is disposed above a top of the countertop.*

*118. The system of claim 114, further comprising the source of cooling energy, the source of cooling energy comprising a refrigeration unit, the refrigeration unit being supported by the upright structure and disposed below the countertop.*

*119. The system of claim 118, wherein the refrigeration unit has a footprint disposed within a footprint of the counter.*

*120. The system of claim 13, further comprising a canopy disposed above the first and second food trays.*

*121. The system of claim 120, wherein the canopy is disposed above the first and second tray supports.*

*122. The system of claim 121, wherein the upright structure includes a first upright member and a second upright member, the first and second upright members extending upward from the first tray support or the second tray support, the canopy being mounted to the first and second upright members.*

*123. The system of claim 69, wherein:*

*the upright structure includes a first upright member and a second upright member, the first upright member being adjacent to a first side of the first tray support and adjacent to a first side of the second tray support, the second upright member being adjacent to a second side of the first tray support and adjacent to a second side of the second tray support;*

*the first food tray includes a second cooling element and the second food tray includes a second heating element, the system further comprising a first controller, the first controller configured to selectively activate and deactivate the first heating element and the second cooling element independent of the second heating element and the first cooling element to selectively operate the first food tray in a heating mode or a cooling mode regardless of a temperature status of the second food tray; and*

*the first food tray is directly coupled to the first tray support and the second food tray is directly coupled to the second tray support.*

*124. The system of claim 123, wherein:*

*the first upright member engages the first tray support and the second tray support, and the second upright member engages the first tray support and the second tray support;*

*an elevation of the first tray support relative to an elevation of the second tray support is fixed;*

*the system further comprises a second controller configured to selectively activate and deactivate the second heating element and the first cooling element independent of the first heating element and the second cooling element to selectively operate the second food tray in a heating mode or a cooling mode regardless of a temperature status of the first food tray; and*

*the first food tray includes a first thermal shield underlying the first heating element and the second cooling element, and wherein the second food tray includes a second thermal shield underlying the first cooling element and the second heating element.*

*125. The system of claim 124, wherein:*

*the first space provides access to the food support surface of the first food tray from a front of the first space;*

*the second space provides access to the food support surface of the second food tray from a front of the second space;*

*the first controller is configured to prevent concurrent activation of the first heating element and the second cooling element, and wherein the second controller is configured to prevent concurrent activation of the second heating element and the first cooling element;*

*the first food tray includes a bottom wall, the first heating element, the second cooling element, and the first thermal shield being disposed between the food support surface of the first food tray and the bottom wall of the first food tray, and wherein the second food tray includes a bottom wall, the first cooling element, the second heating element, and the second thermal shield being disposed between the food support surface of the second food tray and the bottom wall of the second food tray;*

*the first tray support surrounds a perimeter of the first food tray and the second tray support surrounds a perimeter of the second food tray.*

*126. The system of claim 125, wherein the upright structure comprises a counter having a countertop, the countertop supporting the first and second tray supports.*

*127. The system of claim 126, wherein:*

*the first space provides unobstructed access to the food support surface of the first food tray from the front of the first space;*

*the second space provides unobstructed access to the food support surface of the second food tray from the front of the second space;*

*the food support surface of the first food tray is planar and the food support surface of the second food tray is planar;*

*the first food tray is disposed above the second food tray;*

*the second tray support engages the countertop; and*

*the first tray support is disposed above the second tray support, the first tray support including a bottom and the second tray support including a top face, the first and second upright members extending upward from the top face of the second tray support to the bottom of the first tray support.*

*128. The system of claim 13, further comprising a second cooling element coupled to the first food tray and a second heating element coupled to the second food tray, wherein the first food tray is adapted to be operated as a heating tray to or a cooling tray, and wherein the second food tray is adapted to be operated as a cooling tray or a heating tray, the first heating element comprising an electric resistance heating element, the second heating element comprising an electric resistance heating element, and the second cooling element being configured to have cooling fluid circulated there through, wherein the first food tray is disposed above the second food tray.*

*129. The system of claim 128, in combination with the source of cooling energy, and wherein the upright structure comprises a counter comprising a countertop, and the source of cooling energy is in the counter below the countertop, the source of cooling energy comprising a compressor.*

*130. The system of claim 129, wherein the counter is part of a food service counter line arranged for serving food to customers.*

*131. The system of claim 128, further comprising a canopy above the first food tray, the canopy being supported by the upright structure, the canopy including a front side a rear side and having a depth therebetween, the canopy including a left side and a right side and having a width therebetween, the system comprising a first space above the food support surface of the first food tray, the first space configured to permit a consumer in front of the food support surface to see the food support surface of the first food tray, the canopy comprising a front wall extending widthwise of the canopy and extending downward toward the food support surface of the first food tray.*

*132. The system of claim 128, wherein the second food tray includes a front customer side and a rear employee side and a depth extending therebetween, the second food tray includes a left side and a right side and a width extending therebetween, and wherein the upright structure includes a first left column segment left of the food support surface of the second food tray and a first right column segment right of the food support surface of the second food tray, the first left column segment extending upward to the first tray support, and the first right column segment extending upward to the first tray support.*

*133. The system of claim 132, wherein the first right column segment has a front and a rear, the front of the first right column segment being spaced rearward from a front of the food support surface of the second food tray, and the rear of the first right column segment being spaced forward from a rear of the food support surface of the second food tray, and wherein the first left column segment has a front and a rear, the front of the first left column segment being spaced rearward from a front of the food support surface of the second food tray, and the rear of the first left column segment being spaced forward from a rear of the food support surface of the second food tray.*

*134. The system of claim 133, further comprising a canopy over the first food tray, and wherein the upright structure further comprises a second right column segment right of the food support surface of the first food tray and a second left column segment left of the food support surface of the first food tray, the second right column segment extending from the first tray support to the canopy, and the second left column segment extending from the first tray support to the canopy.*

*135. The system of claim 134, wherein the second right column segment is spaced rearward from a front of the food support surface of the first food tray and spaced forward from a rear of the food support surface of the first food tray, and wherein the second left column segment is spaced rearward from the front of the food support surface of the first food tray, and the second right column segment is spaced forward from the rear of the food support surface of the first food tray.*

*136. The system of claim 132, wherein the upright structure comprises a counter comprising a countertop, the second tray support being seated on the countertop, wherein the first right column segment and the first left column segment extend upward from the second tray support.*

*137. The system of claim 132, wherein the upright structure comprises a housing below the second food tray, the second food tray support at least partially covering a top of the housing.*

*138. The system of claim 137, further comprising a canopy over the first food tray, the canopy being supported by the upright structure.*

*139. The system of claim 138, wherein the upright structure comprises a first right column segment, a first left column segment, a second right column segment, and a second left column segment, wherein the second food tray includes a front customer side and a rear employee side and a depth extending therebetween, the second food tray includes a left side and a right side and a width extending therebetween, and wherein the first left column segment is left of the food support surface of the second food tray and the first right column segment is right of the food support surface of the second food tray, the first left column segment extending upward to the first tray support, and the first right column segment extending upward to the first tray support, wherein the first right column segment has a front and a rear, the front of the first right column segment being spaced rearward from a front of the food support surface of the second food tray, the rear of the first right column segment being spaced forward from a rear of the second food tray, and wherein the first left column segment has a front and a rear, the front of the first left column segment being spaced rearward from the front of the food support surface of the second food tray, and the rear of the first left column segment being spaced forward from the rear of the food support surface of the second food tray, wherein the second right column segment is right of the food support surface of the first food tray and extends from the first tray support to the canopy, and wherein the second left column segment is left of the food support surface of the first food tray and extends from the first tray support to the canopy.*

*140. The system of claim 128, wherein the first food tray comprises a first wall extending downward from the food support surface of the first food tray and a second wall extending downward from the food support surface of the first food tray, the second wall located on an opposite side of the food support tray from the first wall.*

*141. The system of claim 140, wherein the first tray support extends outward away from the first wall and outward away from the second wall.*

*142. The system of claim 141, wherein the first heating element and the first cooling element are located between the first and second walls.*

*143. The system of claim 142, further comprising a trough at least partially defined by the first wall and located between the first wall and the first tray support.*

*144. The system of claim 142, wherein the first tray support includes an inner wall opposite and facing the first wall.*

*145. The system of claim 128, wherein the first tray support defines a boarder having an upwardly facing surface extending around a periphery of the first food tray.*

* * * * *